(12) United States Patent
Ishiyama

(10) Patent No.: US 10,113,642 B2
(45) Date of Patent: Oct. 30, 2018

(54) ROTATION DETECTING DEVICE

(71) Applicant: KAWASAKI JUKOGYO KABUSHIKI KAISHA, Hyogo (JP)

(72) Inventor: Keisuke Ishiyama, Kobe (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 65 days.

(21) Appl. No.: 15/359,727

(22) Filed: Nov. 23, 2016

(65) Prior Publication Data
US 2017/0152945 A1  Jun. 1, 2017

(30) Foreign Application Priority Data
Nov. 27, 2015 (JP) .................................. 2015-231277

(51) Int. Cl.
| F16H 63/14 | (2006.01) |
|---|---|
| B62M 25/06 | (2006.01) |
| B62M 9/02 | (2006.01) |
| B62M 11/06 | (2006.01) |

(52) U.S. Cl.
CPC .............. F16H 63/14 (2013.01); B62M 9/02 (2013.01); B62M 11/06 (2013.01); B62M 25/06 (2013.01)

(58) Field of Classification Search
CPC ......... F16H 63/14; B62M 9/02; B62M 11/06; B62M 25/06
See application file for complete search history.

(56) References Cited

U.S. PATENT DOCUMENTS

| 2004/0139795 A1* | 7/2004 | Kawakubo ............. B62M 25/06 73/115.03 |
|---|---|---|
| 2008/0236321 A1* | 10/2008 | Hayakawa ............. F16H 59/70 74/473.1 |
| 2009/0038425 A1* | 2/2009 | Takeuchi ............. F16D 1/0858 74/337 |
| 2009/0084208 A1* | 4/2009 | Hayakawa ............. F16H 59/68 74/325 |
| 2010/0242655 A1* | 9/2010 | Ieda ....................... F16H 63/14 74/473.1 |
| 2010/0321215 A1* | 12/2010 | Kato .................... H01H 25/008 341/35 |
| 2012/0160026 A1* | 6/2012 | Yamashita ............. G01P 3/443 73/504.01 |
| 2014/0090498 A1* | 4/2014 | Kojima ................. F16H 61/688 74/331 |
| 2014/0131131 A1* | 5/2014 | Marois ................... B62J 25/00 180/316 |
| 2015/0231771 A1* | 8/2015 | Sakai .................... B25B 21/026 173/176 |
| 2017/0157753 A1* | 6/2017 | Nagasaka ............ B25B 21/023 |
| 2017/0227094 A1* | 8/2017 | Takahashi ............. B62M 11/06 |

FOREIGN PATENT DOCUMENTS

JP  2004-203313  7/2004

* cited by examiner

*Primary Examiner* — Zakaria Elahmadi
(74) *Attorney, Agent, or Firm* — Wenderoth, Lind & Ponack, L.L.P.

(57) ABSTRACT

A rotation detecting device has a junction body, and a rotation sensor. A rotor of the rotation sensor is spaced from a change drum in the axis direction, and is rotatable about the rotational axis. The rotating position of the rotor is detected by a detector of the rotation sensor. The junction body is separatable from the change drum and the rotation sensor, is rotatable about the rotational axis, and transmits the rotative movement of the change drum to the rotor.

9 Claims, 11 Drawing Sheets

ROTATION DETECTING DEVICE

TECHNICAL FIELD

The present invention relates to a rotation detecting device for detecting the rotation of a rotation member.

BACKGROUND ART

For example, some motorcycles have a transmission mechanism for changing the engaged state of a plurality of gears (e.g., see Japanese Patent Laid-Open Publication No. JP 2004-203313). The transmission mechanism has a rotation drum. The transmission gear ratio of the transmission mechanism is changed according to the rotating position of the rotation drum.

JP 2004-203313 discloses a structure that detects the rotating position of a rotation drum by detecting the contacting position of a conductive wire that is a rotor rotated together with the rotation drum.

However, in the structure described in JP 2004-203313, the rotor is fixed to the rotation drum, which requires a space around the rotation drum. This results in the low degree of freedom of the design. In addition, the relative positional relation between the rotor and the detector detecting the rotor is likely to vary. This is likely to cause a detection error.

The rotation detecting device including the rotation drum also has the above problem when detecting the rotating position of a member other than the rotation drum.

In view of the above circumstances, an object of the present invention is to provide a rotation detecting device that can make the degree of freedom of the design of members higher and can easily improve the detection accuracy of a rotation member to be rotation-detected.

SUMMARY OF THE INVENTION (1) To achieve the above object, a rotation detecting device according to an aspect of the present invention includes a rotation sensor including a rotor spaced from a rotation member in the axial direction of the rotation member and rotatable about the rotational axis of the rotation member, a detector detecting the rotating position of the rotor, and a housing supporting the rotor and the detector, and a junction body separatable from the rotation member and the rotation sensor, rotatable about the rotational axis, and transmitting the rotative movement of the rotation member to the rotor.

With this structure, the rotation of the rotation member can be transmitted to the rotor of the rotation sensor via the junction body separatable from both of the rotation member and the rotation sensor. Thus, the rotation member and the rotation sensor can be sufficiently spaced from each other. By coupling the rotation member and the rotation sensor via the junction body in this manner, the shape limit on both of the rotation member and the rotation sensor can be relaxed. As a result, the degree of freedom of the design of the rotation member and the rotation sensor can be improved. In addition, the rotor and the detector are supported by one housing. Thus, the positional relation between the rotor and the detector can be set with high accuracy, and as a result, the detection accuracy of the rotation member can be improved. Further, the junction body is coaxial with the rotational axis. Thus, the junction body can be supported by at least one of the rotation member and the rotor, so that an exclusive structure for rotatably supporting the junction body can be eliminated. As a result, the detection error in the transmission of rotative movement can be reduced. That is, the detection accuracy of the rotation member can be easily improved. Further, the structure of the rotation detecting device can be made simpler.

(2) Preferably, the junction body is supported by the rotation member on one side in the axial direction extending along the rotational axis, and is supported by the rotor on the other side in the axial direction.

With this structure, the rotation member and the rotor can be spaced in the axial direction more largely. For example, by spacing the rotation member and the rotor in the axial direction, the rotation sensor can be disposed with no interference between the rotation member and other components disposed around the rotation member. In addition, for example, the rotation sensor can be supported by a supporting portion spaced from the rotation member in the axial direction. Further, the junction body is supported at both ends thereof. Thus, the junction body can be supported by a simple structure without requiring exclusive bearings.

(3) More preferably, the junction body includes a supported portion fitted on the inner peripheral face of a tubular section disposed on the rotation member side and formed into a tubular shape to prevent movement in the radial direction with respect to the rotation member, and a rotation prevention portion fitted on a rotation prevention section formed on the end face side of the tubular section to prevent relative movement in the circumferential direction with respect to the rotation member.

With this structure, the supported portion that prevents movement in the radial direction with respect to the rotation member is fitted on the inner peripheral face of the tubular section. In addition, the rotation prevention portion that prevents movement in the circumferential direction with respect to the rotation member is fitted on the rotation prevention section formed on the end face side of the tubular section. By forming the supported portion and the rotation prevention portion at the different positions in this manner, the inner peripheral face of the tubular section can be easily formed.

(4) Preferably, the junction body includes a supported portion fitted on the inner peripheral face of a tubular section disposed on the rotation member side and formed into a tubular shape to prevent movement in the radial direction of the rotational axis with respect to the rotation member, the tubular section is fixed to the rotation member in such a manner that a fixing member separated from the rotation member and fixing the tubular section to the rotation member is inserted through the inner periphery of the tubular section, and the supported portion of the junction body is fitted on the inner peripheral face of the tubular section through which the fixing member is inserted.

With this structure, the supported portion is fitted on the inner peripheral face of the tubular section, and further, the fixing member is fitted on the inner peripheral face of the supported portion. Thus, the tubular section fixes the supported portion, and accommodates the fixing member. Thus, the tubular section can share the structure accommodating the fixing member and the structure supporting the junction body (supported portion). Thus, the shape around the tubular section can be prevented from being complicated. In addition, for example, by removing the fixing member from the tubular section to release the fixing by the fixing member, the junction body can be removed from the tubular section and the rotation member for the replacement of the tubular section.

(5) Preferably, the rotation detecting device further includes a tubular section disposed on the rotation member side, formed into a tubular shape, and supporting the junction body, the tubular section having, on the outer periphery thereof, functioning portions having a function different from the supporting of the junction body.

With this structure, the supporting function of the junction body can be provided inwardly of the functioning portions in the radial direction of the rotational axis. As a result, component sharing between the functioning portions and the portion supporting the junction body is enabled.

(6) More preferably, the functioning portions include transmission portions formed on the outer periphery of the tubular section and transmitting a rotational force to the rotation member, and the junction body is supported by the tubular section inward in the radial direction with respect to the transmission portions.

With this structure, the junction body can be supported by the tubular section without interfering with the transmission portions.

(7) Preferably, the rotation member includes a drum member shifting a shift fork included in a gear transmission mechanism, a rotational force that is provided from a rider is transmitted to the drum member via the functioning portions, and the rotation sensor can detect the angular position of the drum member via the junction body.

With this structure, in the rotation detecting device, the junction body is disposed on the side in which the functioning portions are disposed (or in the portion between the rotation member and the rotation sensor), so that the rotation of the rotation member can be transmitted to the rotation sensor via the junction body. By disposing the junction body in this manner, the rotation sensor can also be disposed on the side in which the functioning portions are disposed. Further, the design change of the rotation member and the rotation sensor due to the design-changed functioning members can be prevented. Thus, the degree of freedom of the design of the rotation detecting device for detecting a gear position (the position of the rotation member) can be made higher.

(8) Preferably, the rotation detecting device further includes a casing main body accommodating the rotation member, and a cover attachably and detachably provided to the casing main body, the housing of the rotation sensor being fixed to the cover.

With this structure, the housing of the rotation sensor is mounted on the cover removable from the casing main body. For example, in a structure that directly fixes the housing of the rotation sensor to the casing main body accommodating the rotation member, the casing main body holding the rotation sensor and accommodating the rotation member is also required to be design-changed at design-changing the rotation sensor. On the contrary, with this structure, even when the cover holding the rotation sensor is required to be design-changed at design-changing the rotation sensor, the casing main body accommodating the rotation member is not required to be design-changed or is required to be design-changed at minimum. Thus, the rotation detecting device can be modified more easily.

(9) Preferably, the rotation detecting device further includes a fitting structure coupling the junction body and the rotation member by fitting, in which in the fitting structure, the gap between the junction body and the rotation member in the radial direction of the rotational axis is larger than the gap between the junction body and the rotation member in the circumferential direction of the rotational axis.

With the above structure, the error of the mounting position when the junction body is mounted on the rotation member can be absorbed by the relative displacement between the junction body and the rotation member in the radial direction. Thus, the accuracy of the setting of the relative position between the junction body and the rotation member is not required to be excessively increased. This can reduce the time and labor in assembling the rotation detecting device. Since the rotation detecting device is used for detecting the rotation of the rotation member, the relative position displacement between the junction body and the rotation member in the circumferential direction of the rotation member is not preferable from the viewpoint of precise rotation detection. On the other hand, the relative position displacement between the junction body and the rotation member in the radial direction of the rotation member is not a significant problem as compared with the relative position displacement in the circumferential direction. Thus, the accuracy of the setting of the relative position between the junction body and the rotation member is not required to be excessively increased, and the detection accuracy of the rotation member detected by the rotation sensor can be made higher. That the gap between the rotation member and the junction body in the radial direction of the rotation member is zero is not precluded.

EFFECTS OF THE INVENTION

According to the present invention, the rotation detecting device can make the degree of freedom of the design of the members higher, and can easily improve the detection accuracy of the rotation member to be rotation-detected.

EMBODIMENTS OF THE INVENTION

Embodiments of the present invention will now be described with reference to the drawings. The present invention is widely applicable as a rotation detecting device.

Figure 1:
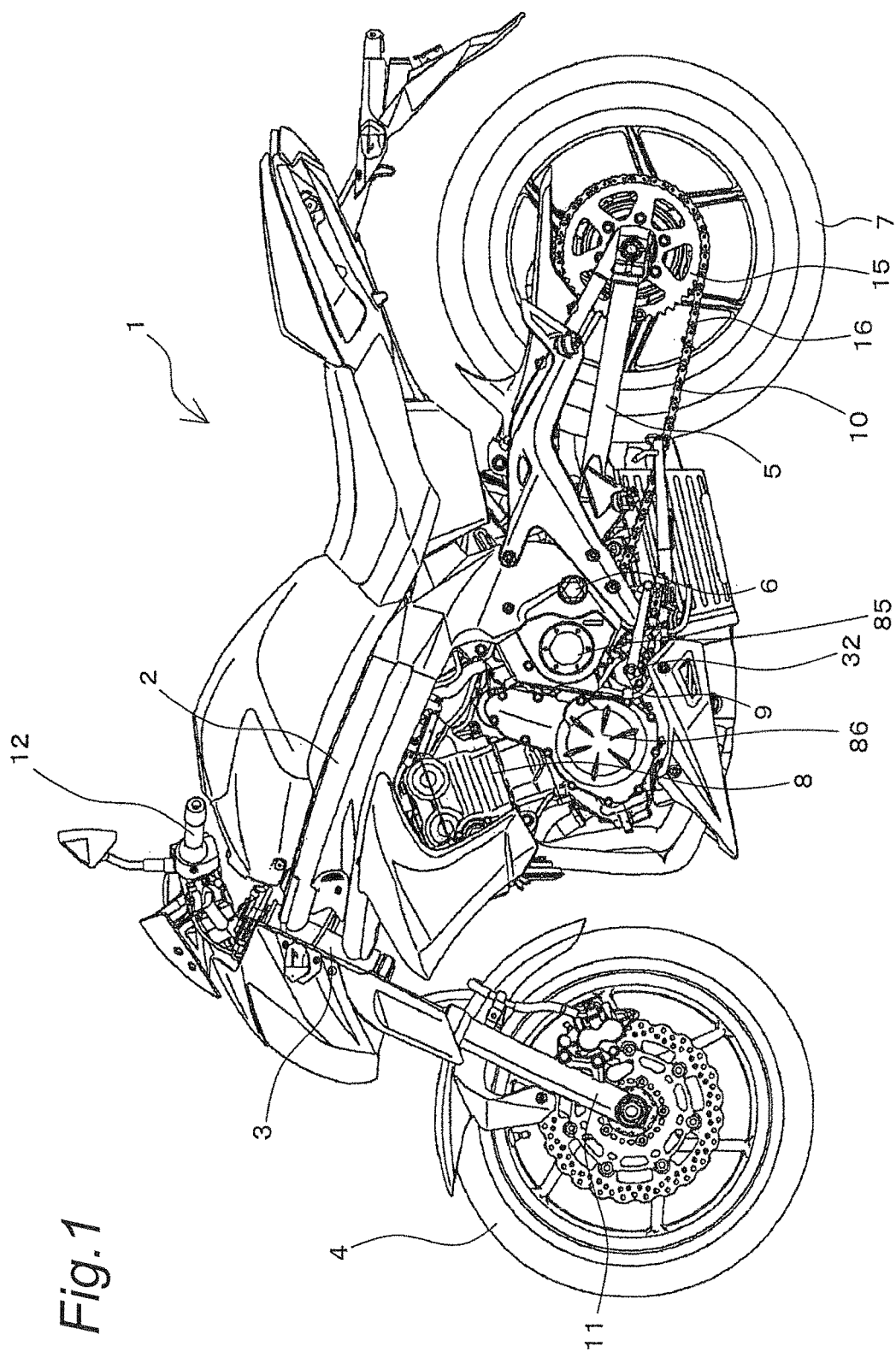
FIG. 1 is a side view of a motorcycle according to an embodiment of the present invention.
Figure 2:
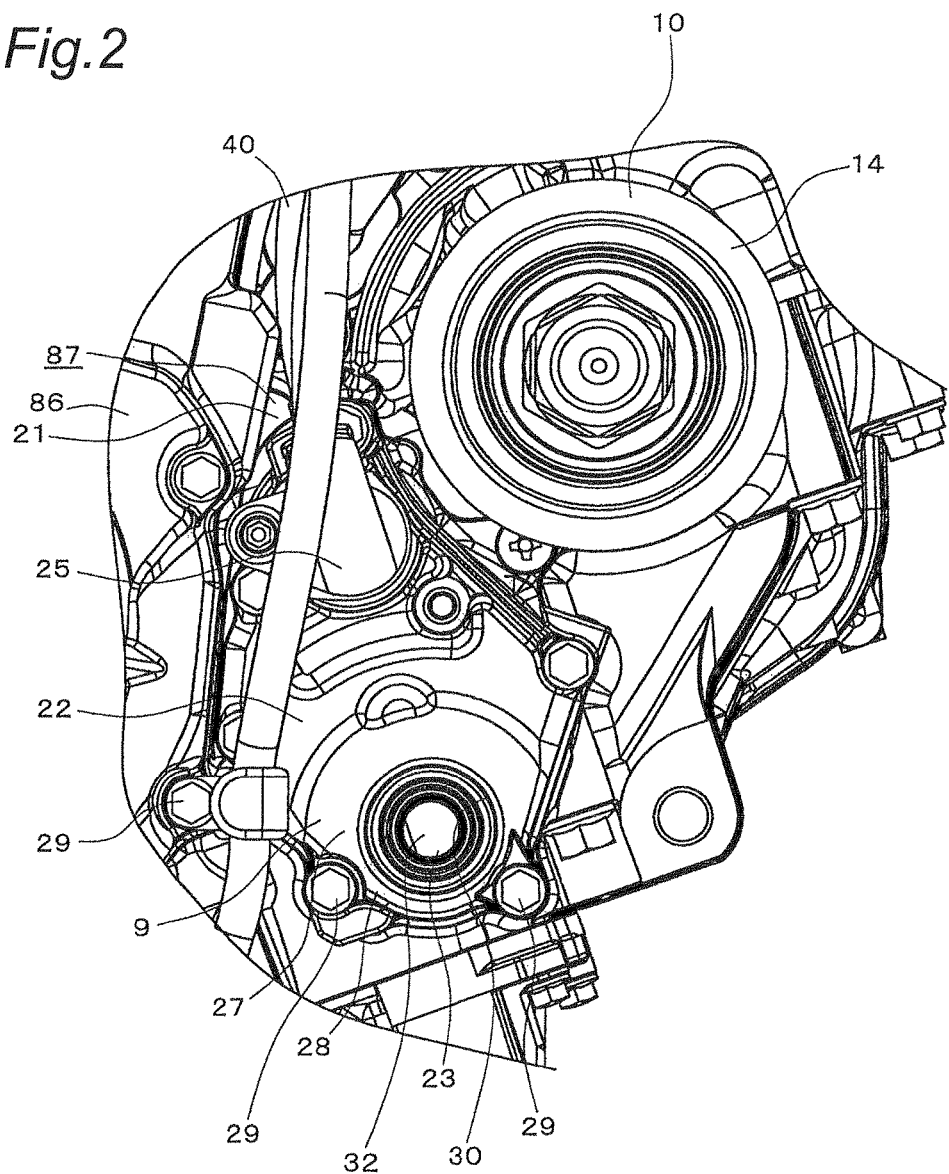
FIG. 2 is an enlarged view illustrating part of the side face of the motorcycle in a state where some components thereof are removed.

FIG. 1 is a side view of a motorcycle 1 according to an embodiment of the present invention. FIG. 2 is an enlarged view illustrating part of the side face of the motorcycle 1 in a state where some components thereof are removed.

Referring to FIGS. 1 and 2, the motorcycle 1 is a manual transmission motorcycle, and is gear-shifted by a rider who is driving the motorcycle 1 (not illustrated). The motorcycle 1 has a rotation detecting device for detecting a shifting position. The structure of the motorcycle 1 will be described below more specifically.

In this embodiment, unless otherwise specified, the up and down, front and rear, and left and right of the rider who is driving the motorcycle 1 are the up and down, front and rear, and left and right, respectively.

The motorcycle 1 has a frame 2, a head pipe 3, a front wheel 4, a swing arm 5, a pivot shaft 6, a rear wheel 7, an engine 8, a transmission mechanism 9, and a power transmission device 10.

The frame 2 extends in the front-rear direction. To the front end of the frame 2, the head pipe 3 is fixed. The head pipe 3 rotatably supports a steering shaft (not illustrated). The steering shaft is coupled to a front fork 11, and is rotatable about the center axis of the head pipe 3 together with the front fork 11.

At the lower end of the front fork 11, the front wheel 4 is mounted. In addition, above the steering shaft, a handlebar 12 is disposed. The handlebar 12 is rotated about the center axis of the head pipe, so that the steering shaft, the front fork 11, and the front wheel 4 are rotated about the center axis of the head pipe.

On the rear lower side of the frame 2, the swing arm 5 is disposed. The swing arm 5 is swingable about the pivot shaft 6 mounted at the front end thereof in the up-down direction with respect to the frame 2. At the rear end of the swing arm 5, the rear wheel 7 is mounted. In front of the swing arm 5, the engine 8 is mounted on the frame 2. The engine 8 is, for example, a water cooled 4-cycle engine. The output of the engine 8 is transmitted to the rear wheel 7 via the transmission mechanism 9 and the power transmission device 10.

In this embodiment, the transmission mechanism 9 is a gear transmission mechanism, and is gear-shifted by the rider. In addition, the power transmission device 10 is, for example, a chain driving type power transmission device.

The power transmission device 10 has a driving side sprocket 14 rotated by receiving the output of the engine 8 (transmission mechanism 9), a driven side sprocket 15 integrally rotated with the rear wheel 7, and a chain 16 entrained on the sprockets 14 and 15.

The transmission mechanism 9 will be described more specifically.

Figure 3:
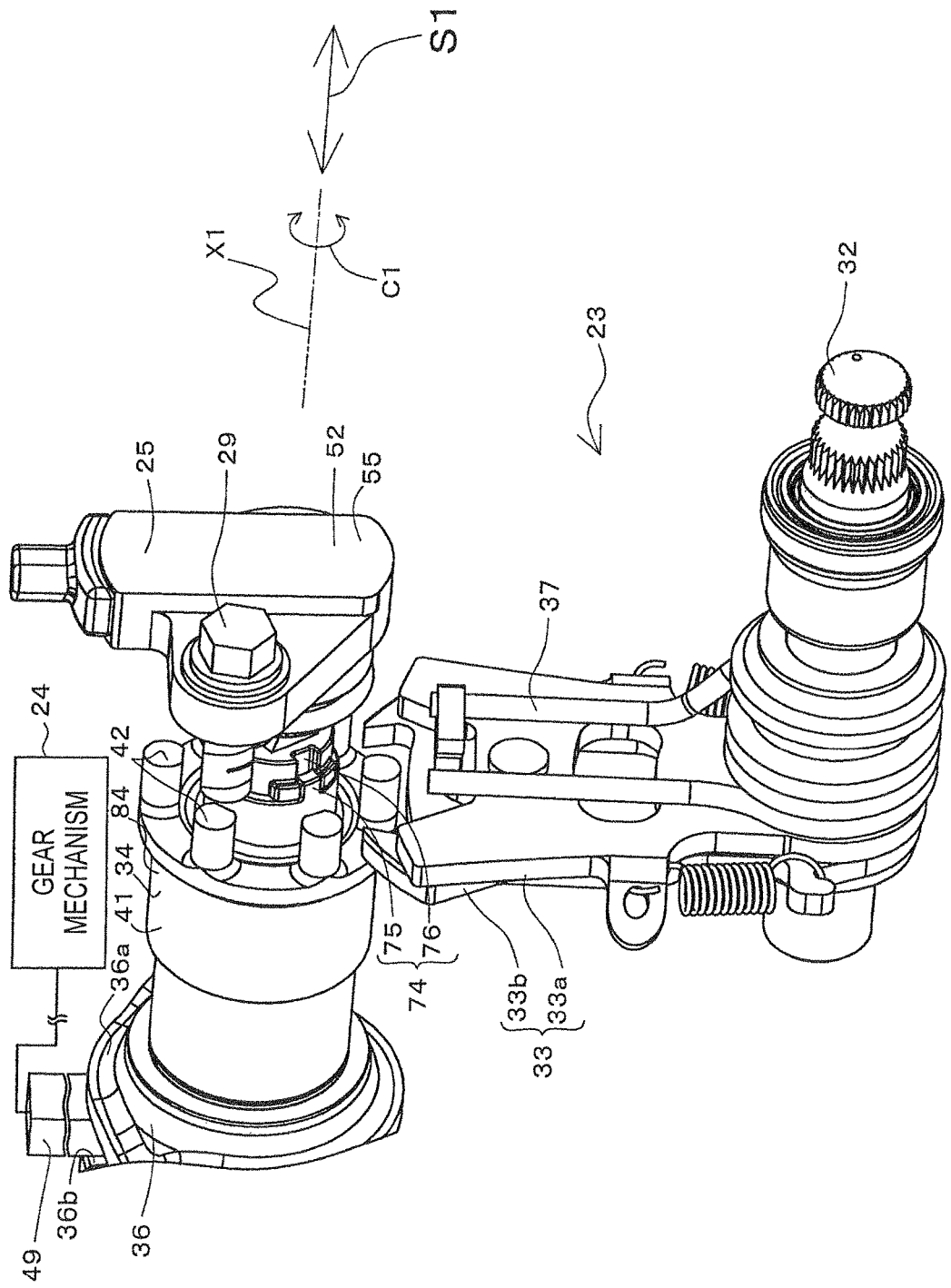
FIG. 3 is a perspective view illustrating part of a transmission mechanism.
Figure 4:
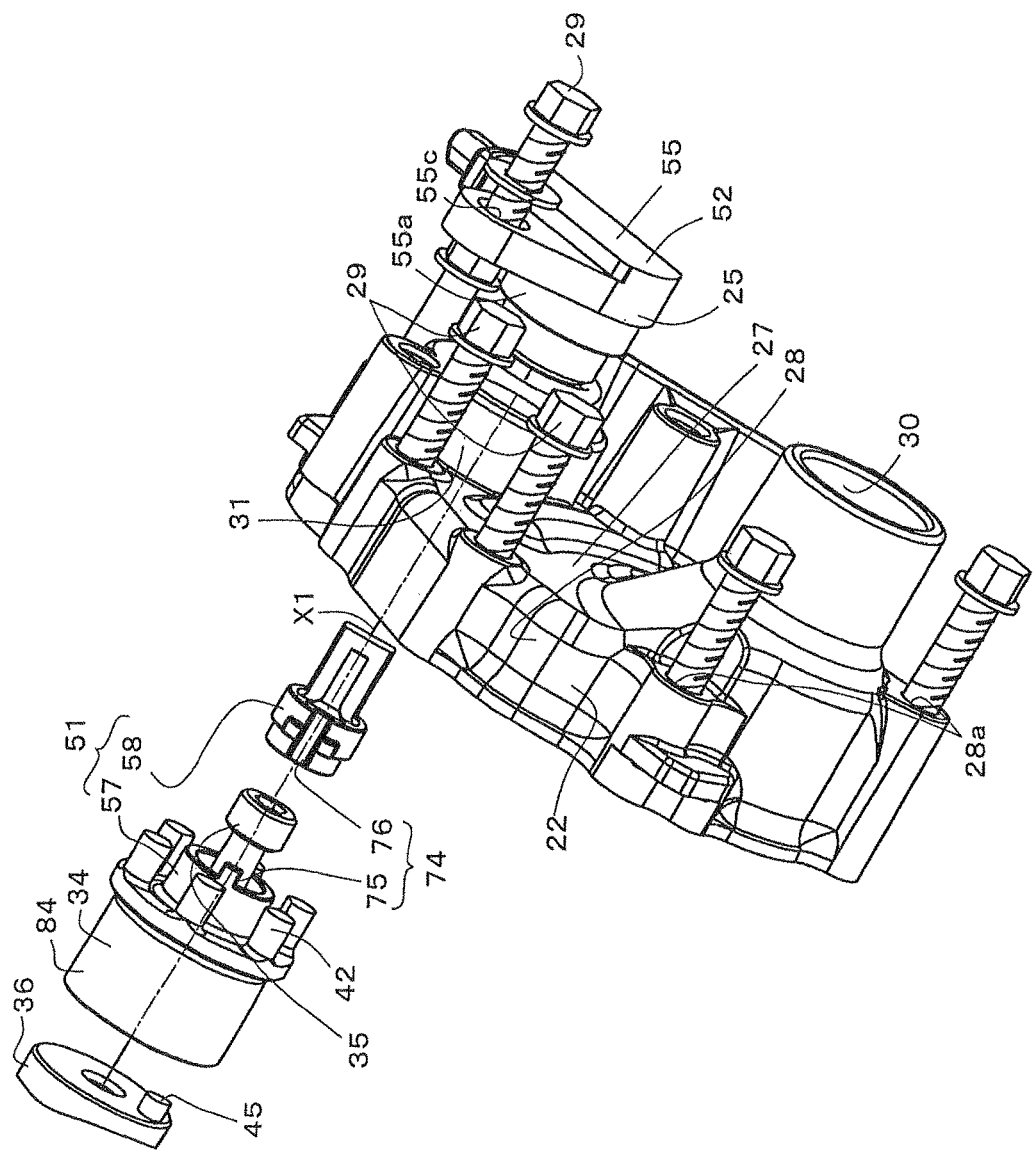
FIG. 4 is an exploded perspective view illustrating part of the transmission mechanism.
Figure 5:
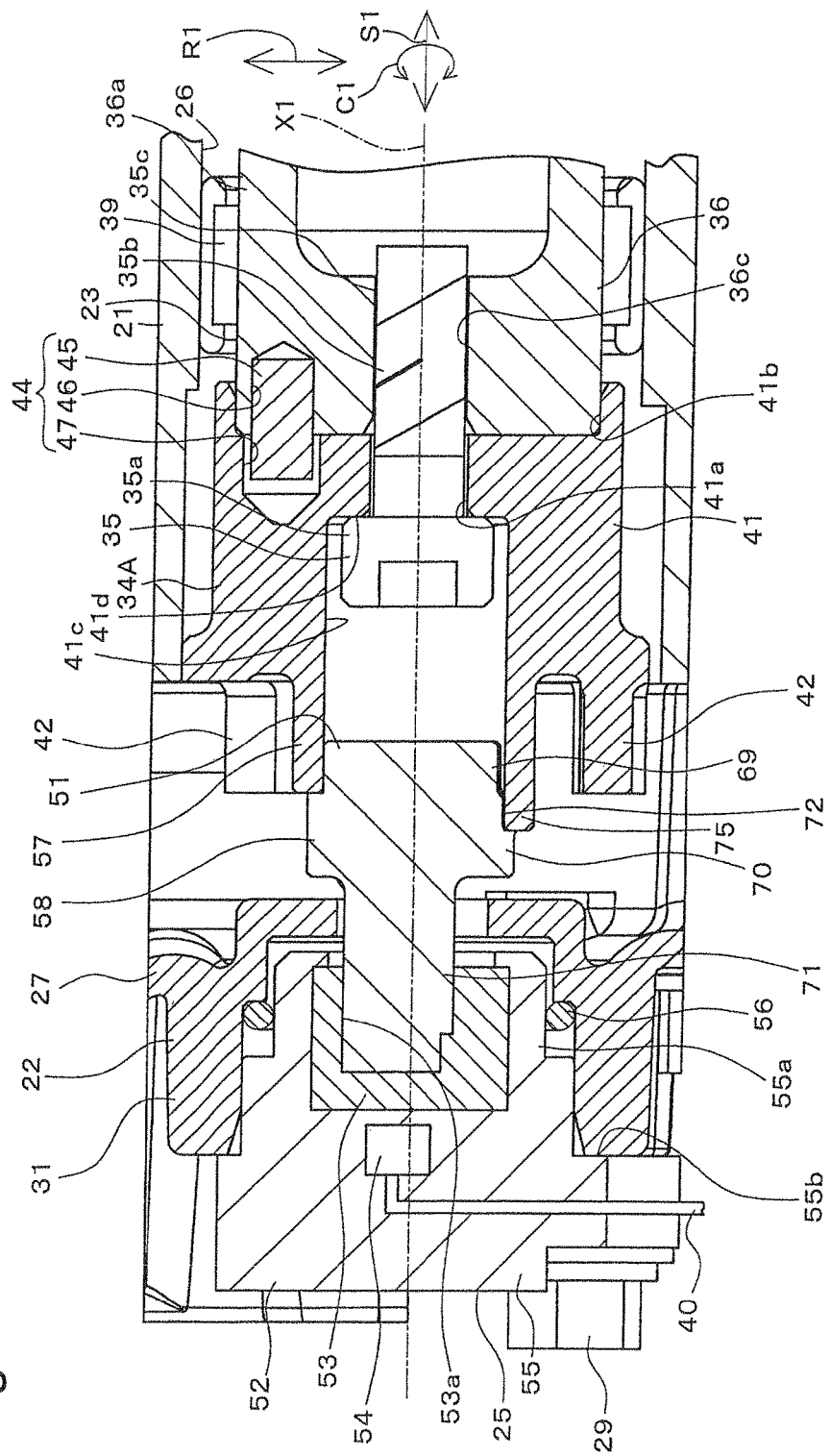
FIG. 5 is a cross-sectional view illustrating the main portion of the transmission mechanism.
Figure 6:
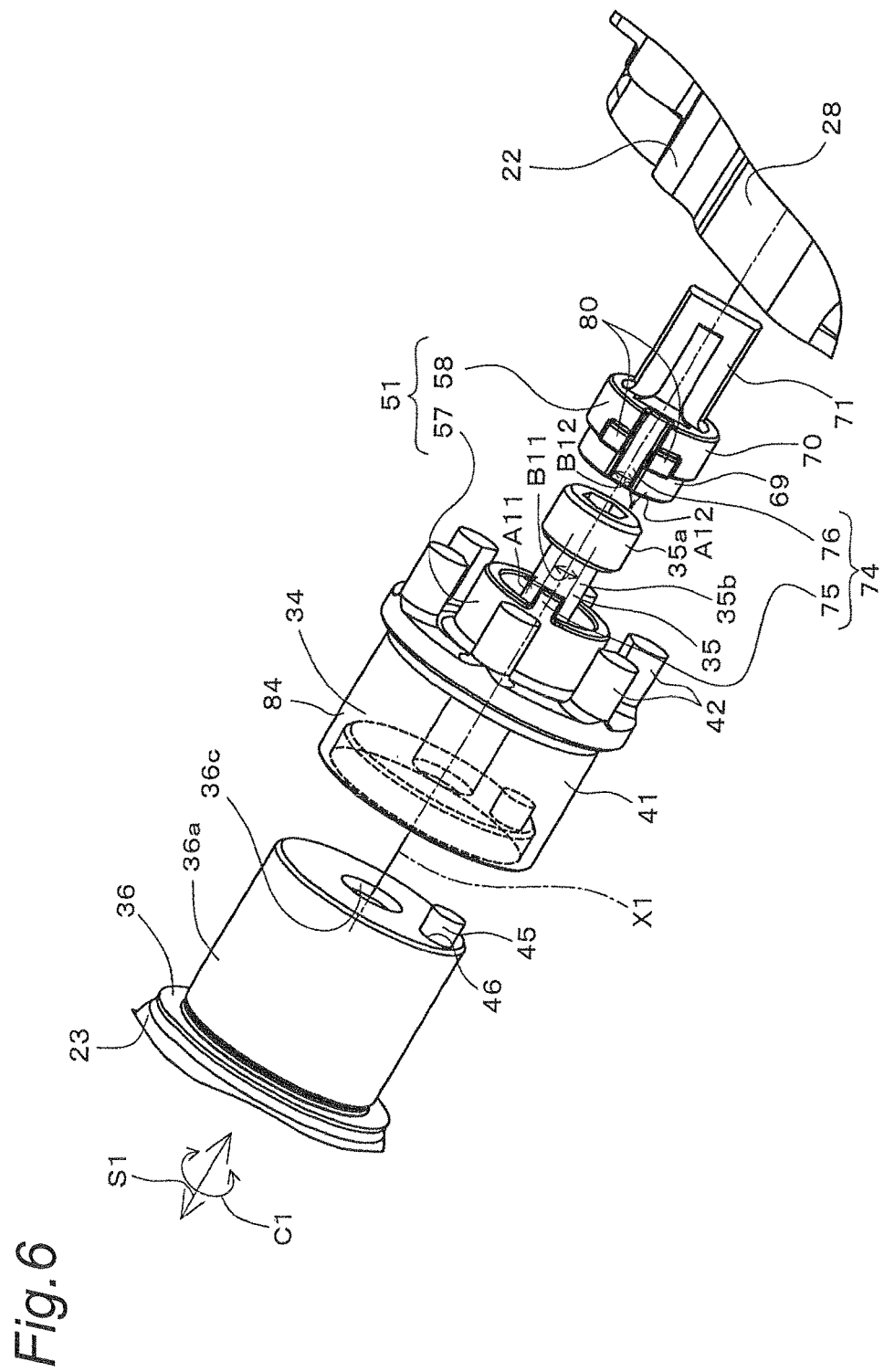
FIG. 6 is an exploded perspective view illustrating the main portion of the transmission mechanism.

FIG. 3 is a perspective view illustrating part of the transmission mechanism 9. FIG. 4 is an exploded perspective view illustrating part of the transmission mechanism 9. FIG. 5 is a cross-sectional view illustrating the main portion of the transmission mechanism 9. FIG. 6 is an exploded perspective view illustrating the main portion of the transmission mechanism 9.

Referring to FIGS. 2 to 6, the transmission mechanism 9 has a casing main body 21, a transmission cover 22, an operation mechanism 23, a gear mechanism 24, and a rotation detecting device 25.

The transmission mechanism 9 changes the engaged state of a plurality of gears in the gear mechanism 24 to speed-reduce rotation transmitted from a crankshaft (not illustrated) in the engine 8, and then transmits the rotation to the driving side sprocket 14 of the power transmission device 10. The casing main body 21 accommodates the plurality of gears included in the gear mechanism 24 (not illustrated), the operation mechanism 23, and part of the rotation detecting device 25. The casing main body 21 has an accommodation hole 26 opened sideward (in this embodiment, to the left side). The accommodation hole 26 is covered by the transmission cover 22.

The transmission cover 22 is formed of, for example, a cast iron or a synthetic resin, and in this embodiment, is an integrally molded article. The transmission cover 22 is recessed at the side face thereof opposite to the casing main body 21 (in this embodiment, at the right side face thereof). The transmission cover 22 is provided attachably and detachably to the casing main body 21. To the transmission cover 22, a housing 55 of a later-described rotation sensor 52 is fixed.

The transmission cover 22 has a cover main body 27, and an outer peripheral edge 28.

The cover main body 27 extends to cover the accommodation hole 26. On the outer periphery of the cover main body 27, the outer peripheral edge 28 is formed. The outer peripheral edge 28 extends from the outer periphery of the cover main body 27 toward the casing main body 21 (in this embodiment, to the right side). In the outer peripheral edge 28, a plurality of screw insertion holes 28a are formed. The screw insertion holes 28a are disposed at predetermined intervals along the outer periphery of the cover main body 27. Into the screw insertion holes 28a, corresponding screws 29 are inserted. The screws 29 are screwed into female screws formed in the casing main body 21 (not illustrated). Thus, the transmission cover 22 is fixed to the casing main body 21.

In the cover main body 27, a change shaft insertion hole 30 and a sensor holding section 31 are disposed.

Through the change shaft insertion hole 30, a later-described change shaft 32 of the operation mechanism 23 penetrates. The change shaft insertion hole 30 is formed into a cylindrical shape projecting toward the outer face of the cover main body 27 (in this embodiment, to the left side). The sensor holding section 31 is provided adjacently to the change shaft insertion hole 30.

The sensor holding section 31 holds the housing 55 of the rotation sensor 52 of the rotation detecting device 25. The sensor holding section 31 is formed into a cylindrical shape projecting toward the outer face of the cover main body 27 (in this embodiment, to the left side). The center axis of the sensor holding section 31 is aligned in parallel with the center axis of the change shaft insertion hole 30.

The sensor holding section 31 is disposed above the change shaft insertion hole 30 and below the rotation shaft of the driving side sprocket 14 in a state where the transmission cover 22 is mounted as part of the vehicle body.

Around the transmission cover 22 having the above structure, the operation mechanism 23 is disposed. The operation mechanism 23 changes the engaged state of the plurality of gears in the gear mechanism 24 (not illustrated) of the transmission mechanism 9.

The operation mechanism 23 has the change shaft 32, a change lever 33, a change cam 34, a fixing member 35, and a change drum (rotation member) 36.

The change shaft 32 is a shaft member extending in the left-right direction. The change shaft 32 extends from the accommodation hole 26 inside the casing main body 21 to the outside of the casing main body 21 through the change shaft insertion hole 30. The change shaft 32 is rotatably moved by an operation by the foot of the rider. In the intermediate portion of the change shaft 32, the change lever 33 is mounted to transmit the rotation of the change shaft 32 to the change cam 34.

The change lever 33 has a lever main body 33a, and a slide plate 33b.

The lever main body 33a is a plate-shaped member fixed to the change shaft 32, and is swingable about the change shaft 32. Around the lever main body 33a, a return spring 37 is disposed.

The slide plate 33b adjacent to the lever main body 33a is an elongated plate-shaped member. The base end of the slide plate 33b is mounted on the change shaft 32. At the distal end of the slide plate 33b, a pair of hook-shaped shift pawls 33c are disposed. The slide plate 33b is slidably held to one side face of the lever main body 33a. The pair of shift pawls 33c are brought into contact with a plurality of pins 42 of the change cam 34 so that the change cam 34 can be rotated by a predetermined angle at a time.

The change cam 34 is a member formed into a tubular shape (in this embodiment, into a substantially cylindrical shape). The change cam 34 is integrated with a first junction member 57 of a later-described junction body 51 by using a single member. That is, the change cam 34 and the first junction member 57 are formed in a unit member 84 as the single member. In addition, the change cam 34 is integrally rotatably coupled to the change drum 36. Further, the change cam 34 is a rotational force transmission member for transmitting a driving force that rotates the change drum 36, from the change lever 33 to the change drum 36. The change cam 34 is coaxial with the change drum 36.

The change cam 34 has a tubular section 41, and the plurality of pins 42.

In this embodiment, the tubular section 41 is a member formed into a cylindrical shape, and is coupled to the change drum 36 so as to be integrally rotatable about rotational axis X1 (center axis) of the change drum 36.

In this embodiment, axis direction (axial direction) S1 of rotational axis X1 is simply referred to as "axis direction S1". In addition, circumferential direction C1 about rotational axis X1 is simply called "circumferential direction C1". Further, radial direction R1 of rotational axis X1 is simply referred to as "radial direction R1".

The tubular section 41 has a screw insertion hole 41a, a guide 41b on the inner periphery of the tubular section 41, a large-diameter section 41c, and a step 41d.

The large-diameter section 41c accommodates a head 35a of the fixing member 35.

The fixing member 35 mutually fixes the first junction member 57, the change cam 34, and the change drum 36. In this embodiment, the fixing member 35 is a bolt.

The fixing member 35 has the head 35a rotated by a tool, such as a hexagonal wrench, and a shaft 35b extending from the head 35a. At the end of the shaft 35b, a male screw 35c is formed.

The large-diameter section 41c is formed into a cylindrical shape having a fixed diameter, and extends along axis direction S1. The large-diameter section 41c is opened toward the rotation sensor 52. At the end of the large-diameter section 41c on the change drum 36 side, the step 41d is formed. The step 41d receives the head 35a of the fixing member 35.

The step 41d is a face extending in the direction orthogonal to rotational axis X1. The step 41d is disposed between the pins 42 of the change cam 34 and a later-described first fitting structure 44 in axis direction S1. From the step 41d, the screw insertion hole 41a extends.

Through the screw insertion hole 41a, the shaft 35b of the fixing member 35 penetrates. The screw insertion hole 41a is aligned with a first rotation prevention member 45 of the first fitting structure 44 in radial direction R1. The shaft 35b of the fixing member 35 penetrates through the screw insertion hole 41a. Further, the male screw 35c formed at the end of the shaft 35b is screwed into a female screw 36c formed at one end 36a of the change drum 36. Thus, the fixing member 35 is fixed to the change drum 36.

The above description will be described more specifically. The screw insertion hole 41a extends coaxially with the tubular section 41, and penetrates through the one end side portion of the tubular section 41 in axis direction S1. At one end of the shaft 35b of the fixing member 35, the head 35a having a larger diameter than the shaft 35b is formed. The inner space defined by the large-diameter section 41c of the tubular section 41 is larger than the shape of the head 35a of the fixing member 35 in radial direction R1. The step 41d of the tubular section 41 is opposite to the head 35a of the fixing member 35 in axis direction S1. The fixing member 35 presses the change cam 34 against the change drum 36 along axis direction S1, so that the change cam 34 is sandwiched between the fixing member 35 and the change drum 36 in axis direction S1, thereby being fixed to the change drum 36.

The fixing member 35 fastens the later-described first junction member 57 and the change cam 34 to the change drum 36. More specifically, the head 35a of the fixing member 35, the step 41d, and the change drum 36 are aligned in parallel with axis direction S1. Thus, the head 35a of the fixing member 35 and the change drum 36 fasten one end of the change cam 34 on the change drum 36 side.

In this way, the tubular section 41 of the change cam 34 is fixed to the change drum 36 by inserting the fixing member 35, which is separated from the change drum 36 and fixes the tubular section 41 to the change drum 36, through the inner periphery of the tubular section 41.

From one end of the tubular section 41, the plurality of pins 42 project along axis direction S1. The pins 42 are formed into, for example, a columnar shape. The pins 42 are fixed to the tubular section 41 at intervals, or at equal intervals in this embodiment, in circumferential direction C1 of the tubular section 41. The pins 42 extend in parallel with axis direction S1.

In this embodiment, the number of the pins 42 is six. The pins 42 direct to the transmission cover 22, and are disposed in the transmission cover 22 to project from the accommodation hole 26 of the casing main body 21. The pins 42 are adjacent to the change lever 33, and can be brought into contact with the shift pawls 33c.

In this way, the pins 42 are disposed on the outer periphery of the tubular section 41 of the change cam 34. The pins 42 are the functioning portions of the change cam 34 having a function different from the supporting of the junction body 51. The pins 42, which receive the operational force of the change lever 33, are also transmission portions that transmit the rotational force to the change drum 36. The junction body 51 is supported by the tubular section 41 of the change cam 34 inward in the radial direction with respect to the pins 42.

At the end of the tubular section 41 on the change drum 36 side, the screw insertion hole 41a is formed. Through the screw insertion hole 41a, the end of the shaft 35b of the fixing member 35 penetrates.

As described above, the tubular section 41 is integrally rotatably coupled to the change drum 36. Specifically, the guide 41b is recessed toward one end face of the tubular section 41 directing to the change drum 36. The guide 41b is a recess corresponding to the shape of the one end (left end) 36a of the change drum 36. In the guide 41b, the one end 36a of the change drum 36 is fitted with spacing in radial direction R1.

By forming the guide 41b in this manner, the change cam 34 can be guided to a predetermined position with respect to the change drum 36. Thus, the change cam 34 can be easily mounted.

Further, the tubular section 41 (change cam 34) and the change drum 36 are coupled by using the later-described first fitting structure 44 so as to prevent relative rotation about rotational axis X1 (relative rotation in circumferential direction C1).

The first fitting structure 44 couples the change drum 36 and the change cam 34 (junction body 51) by fitting. In the first fitting structure 44, the gap (position adjustable amount) between the change drum 36 and the change cam 34 (junction body 51) in radial direction R1 is larger than the gap between the change drum 36 and the change cam 34 (junction body 51) in circumferential direction C1.

The first fitting structure 44 includes the first rotation prevention member 45, a hole 46 formed in one of the change drum 36 and the change cam 34, and a long hole 47 formed in the other of the change drum 36 and the change cam 34.

The first rotation prevention member 45 is, for example, a columnar pin member. The first rotation prevention member 45 prevents relative rotation between the change drum 36 and the change cam 34 about rotational axis X1. The first rotation prevention member 45 is disposed inwardly of the change cam 34 and the change drum 36 so as to be spaced from rotational axis X1 in radial direction R1.

In this embodiment, the first rotation prevention member 45 is fitted in the hole 46 formed in the end face of the one end 36a of the change drum 36. The hole 46 fits and fixes the first rotation prevention member 45 therein to prevent the first rotation prevention member 45 from being displaced from the hole 46 in circumferential direction C1. In addition, in this embodiment, the first rotation prevention member 45 is fitted in the long hole 47 formed in the bottom face of the guide 41b of the change cam 34.

The long hole 47 elongatedly extends along radial direction R1 in the cross section orthogonal to axis direction S1. The C1 direction dimension of the long hole 47 in circumferential direction C1 is substantially the same as the diameter (C1 direction dimension) of the first rotation prevention member 45. On the other hand, the radial direction R1 dimension of the long hole 47 is larger than the diameter (R1 direction dimension) of the first rotation prevention member 45. In this embodiment, the dimension in circumferential direction C1 is sometimes referred to as a C1 direction dimension, and the dimension in radial direction R1 is sometimes referred to as an R1 direction dimension.

Figure 7:
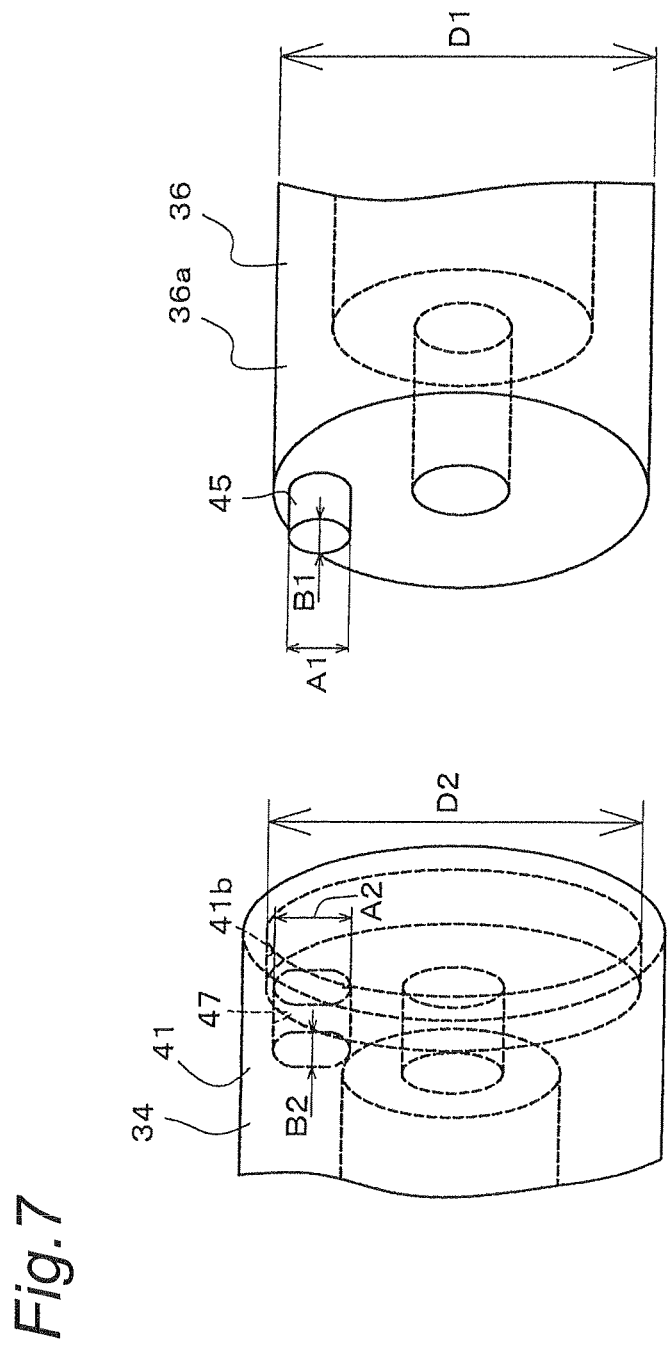
FIG. 7 is a schematic perspective view of assistance in explaining a first fitting structure.

More specifically, referring to FIG. 7 that is a schematic perspective view of assistance in explaining the first fitting structure 44, the R1 direction dimension of the first rotation prevention member 45 is R1 direction dimension A1, and the C1 direction dimension of the first rotation prevention member 45 is C1 direction dimension B1. In addition, the R1 direction dimension of the long hole 47 is R1 direction dimension A2, and the C1 direction dimension of the long hole 47 is C1 direction dimension B2. D1 is the diameter (outside diameter) of the outer peripheral face of the one end 36a of the change drum 36. D2 is the diameter (inside diameter) of the inner peripheral face of the guide 41b of the tubular section 41 of the change cam 34.

In this embodiment, A2>A1. In addition, B2>B1. Further, D2>D1. Furthermore, (A2–>(B2–B1). That is, in the first fitting structure 44, the gap between the change cam 34 (junction body 51) and the change drum 36 in radial direction R1 (A2–A1) is larger than the gap between the change cam 34 (junction body 51) and the change drum 36 in circumferential direction C1 (B2–B1).

Referring to FIGS. 1 to 3, 5, and 6, in the above structure, while the transmission error in circumferential direction C1 of the first rotation prevention member 45 and the change cam 34 can be prevented, the dimension error in radial direction R1 can be easily absorbed. The hole 46 fixing the first rotation prevention member 45 may be formed in the bottom face of the guide 41b of the change cam 34, and the long hole 47 may be formed in the end face of the one end 36a of the change drum 36.

By mutually fixing the change drum 36 and the change cam 34 in axis direction S1 by the fixing member 35 in this manner as well as by the first fitting structure 44, the change drum 36 and the change cam 34 are prevented from being rotated about rotational axis X1. Thus, the power from the change lever 33 can be transmitted to the change drum 36.

The change drum 36 is a drum member for shifting a shift fork 49 included in the gear transmission mechanism 9 in axis direction S1. The rotational force from the rider is transmitted to the change drum 36 via the change shaft 32, the change lever 33, and the change cam 34.

On both sides of the change drum 36 in axis direction S1, bearing portions rotatably supporting the change drum 36 are disposed. In FIG. 5, a bearing 39 rotatably supporting the one end 36a of the change drum 36 is illustrated. The bearing 39 is supported by the inner peripheral face of the accommodation hole 26 of the casing main body 21. The change cam 34 is disposed on the transmission cover 22 side with respect to the bearing 39 on the change cam 34 side in axis direction S1.

The change drum 36 is parallel to the change shaft 32 in the accommodation hole 26 of the casing main body 21. On the outer periphery of the change drum 36, plural (e.g., three) cam grooves 36b are formed. In FIG. 3, only one cam groove 36b is illustrated. The cam groove 36b extends along the circumferential direction of the change drum 36, so that the position in the axis direction of the change drum 36 is changed. The cam groove 36b is coupled to the end of the corresponding shift fork 49. In FIG. 3, only one shift fork 49 is illustrated. With the rotation of the change drum 36, the position of the shift fork 49 is changed.

With the above structure, in the gear shifting of the transmission mechanism 9, the change shaft 32 and the change lever 33 are rotated in any one of the directions by a change pedal (not illustrated) operated by the rider. With this, one of the shift pawls 33c of the slide plate 33b is brought into contact with one of the pins 42. As a result, the change cam 34 and the change drum 36 are intermittently rotated by a predetermined angle. Thus, the position of the shift fork 49 is moved in parallel with rotational axis X1 of the change drum 36. As a result, the power transmission state of the plurality of gears of the transmission mechanism 9 is changed to complete the gear shifting.

The rotating position of the change drum 36 is detected by the rotation detecting device 25. That is, the shifting position that is changed corresponding to the change of the rotating position of the change drum 36 is detected as a shift stage signal by the rotation detecting device 25.

The shift stage signal that is detected by the rotation detecting device 25 is provided to a controller (not illustrated) included in the motorcycle 1. For example, the shift stage signal is input to a meter display device (not illustrated) disposed around the handlebar 12 in the motorcycle 1, so that the shift stage that is designated by the shift stage signal is displayed on the meter of the meter display device. In addition, for example, the shift stage signal is input to an engine controller (not illustrated) included in the motorcycle 1, so that the engine is controlled based on the shift stage. Further, for example, the shift stage signal is input to a storage device (not illustrated) included in the motorcycle 1, so that the driving information including the shift stage can be identified after the running of the motorcycle 1.

The rotation detecting device 25 is adjacent to the change drum 36, and in this embodiment, is coaxial with the change drum 36.

The rotation detecting device 25 has the junction body 51 for the junctioning of the rotation operation of the change drum 36, the rotation sensor 52 for detecting the rotational operation of the junction body 51 (change drum 36), the casing main body 21, and the cover 22.

The rotation sensor 52 detects the rotation angular position of the change drum 36 via the junction body 51. In other words, the rotation sensor 52 is a gear position sensor for detecting the operated state of the transmission mechanism 9. The rotation sensor 52 detects the rotating position of the change drum 36 via the junction body 51. The rotation sensor 52 is, for example, a magnetic sensor, and detects the change of the magnetic flux with the rotation of the change drum 36. Although in this embodiment, the rotation sensor 52 detects the change of the magnetic flux, the present invention is not limited to this structure.

The rotation sensor 52 has a rotor 53, a detector 54, and the housing 55.

The rotor 53 is spaced from the change drum 36 in axis direction S1, and is rotatable about rotational axis X1. The rotor 53 is integrally rotatable with the junction body 51 and the change drum 36. The rotor 53 is a member formed into a small annular shape.

The rotor 53 includes a permanent magnet to generate a magnetic field in a predetermined direction. The rotor 53 is rotated about the axis so that the direction of the magnetic flux is changed.

In the rotor 53, a hole 53a is formed. Into the hole 53a, a distal end 71 of a later-described second junction member 58 of the junction body 51 is inserted. The hole 53a is formed into an engaging shape (recessed shape) corresponding to the shape of the distal end 71 of the second junction member 58. Thus, the rotor 53 is integrally rotatably coupled to the junction body 51. The rotor 53 is adjacent to the detector 54.

The detector 54 detects the rotating position of the rotor 53. More specifically, the detector 54 detects the change of the magnetic flux with the rotation of the rotor 53. The detector 54 includes hall IC.

The detector 54 is disposed in the position where it can detect the direction of the magnetic flux that is generated by the stator 53. Specifically, the detector 54 is fixed to the absolute position where the position and posture thereof with respect to the vehicle body are fixed regardless of the rotation of the rotor 53. The stator 53 can output the direction of the detected magnetic field as an electric signal.

Referring to FIGS. 1, 2, and 5, the detector 54 has a wiring 40 including a wiring supplying the driving power that drives the detector 54 and a wiring outputting a detection signal from the detector 54. The stator 53 is fixed to the transmission cover 22 via the housing 55. Thus, the wiring 40 can be prevented from being displaced together with the change drum 36, so that the structure can be simplified. The wiring 40 extends upward through between a chain cover 85 covering the chain 16 (only illustrated in FIG. 1) and a generator cover 86 covering one side of the crankshaft in the engine 8 (not illustrated). The wiring 40 passes through a space 87 that is interposed between the chain cover 85 and the generator cover 86 and is recessed inward in the vehicle width direction. Thus, the wiring 40 is protected by the covers 85 and 86, so that any obstacle can be prevented from coming into contact with the wiring 40. The detector 54 is supported by the housing 55.

Referring to FIGS. 3 to 6, the housing 55 supports the detector 54 and the rotor 53. The housing 55 is formed of, for example, a synthetic resin.

The housing 55 has a tubular section 55a, and a seat 55b continuous to the tubular section 55a.

The tubular section 55a of the housing 55 is formed into, for example, a cylindrical shape. The tubular section 55a holds the detector 54, receives the outer periphery of the rotor 53, and rotatably supports the rotor 53 about rotational axis X1. The tubular section 55a of the housing 55 is inserted into the sensor holding section 31 of the transmission cover 22. Between the outer peripheral face of the tubular section 55a of the housing 55 and the inner peripheral face of the sensor holding section 31, an O-ring 56 is disposed as a seal member. Thus, the portion between the tubular section 55a and the sensor holding section 31 is liquid-tight. To the base end of the tubular section 55a of the housing 55, the seat 55b is connected.

The seat 55b is disposed outside the transmission cover 22. In the seat 55b, a screw insertion hole 55c through which one screw member 29 penetrates is formed. The screw member 29 is inserted through the corresponding screw insertion hole 28a to fix the transmission cover 22 to the casing main body 21. The seat 55b is fixed to the transmission cover 22 by using the screw 29 in a state where the seat 55b is received by the end face of the sensor holding section 31 and the outer peripheral edge 28 of the transmission cover 22. The rotation sensor 52 having the above structure is adjacent to the junction body 51 in axis direction S1.

The junction body 51 is separatable from both of the change drum 36 and the rotation sensor 52, is coaxial with rotational axis X1, and is rotatable about rotational axis X1. The junction body 51 transmits the rotative movement of the change drum 36 to the rotor 53 of the rotation sensor 52.

The junction body 51 is formed into a shaft shape elongatedly extending in axis direction S1. In addition, the junction body 51 is disposed from the accommodation hole 26 of the casing main body 21 to the space in the transmission cover 22. The end of the junction body 51 on the change cam side is integrated with the change cam 34. That is, part of the junction body 51 is formed in the unit member 84 to configure the portion continuous to the change cam 34. On the other hand, the end of the junction body 51 on the rotation sensor side is disposed in the rotation sensor 52.

In addition, in this embodiment, the junction body 51 is supported at both ends thereof by the change drum 36 and the rotation sensor 52. More specifically, the end of the junction body 51 on the change drum side is integrated with the change cam 34, and is supported by the change drum 36 via the change cam 34. In addition, the end of the junction body 51 on the sensor side is supported by the rotor 53 of the rotation sensor 52. The junction body 51 is disposed in series with the change drum 36 and the rotation sensor 52, and in this embodiment, is separated from the change drum 36.

The junction body 51 is supported at both ends thereof in axis direction S1 in such a manner that one of the ends thereof is inserted into the rotor 53 of the rotation sensor 52 and that the other end thereof is integrated with the change cam 34. In addition, the junction body 51 has an engaging structure engaging with the rotor 53 of the rotation sensor 52 in a state where relative rotation about rotational axis X1 is prevented. Likewise, the junction body 51 is integrated with the change cam 34 in a state where relative rotation about the axis is prevented. Thus, the rotative movement of the change drum 36 is transmitted to the rotor 53 via the junction body 51.

The junction body 51 includes the first junction member 57 and the second junction member 58 as the plurality of junction members, which are disposed in series in axis direction S1.

The first junction member 57 is coupled to the change drum 36 via the change cam 34 so as to be integrally rotatable about rotational axis X1. In addition, the first junction member 57 supports the second junction member 58. In this embodiment, the first junction member 57 is coupled to the change drum 36 via the change cam 34. However, the present invention is not limited to this. For example, the first junction member 57 may be coupled to the change drum 36 in a state where the first junction member 57 is in direct contact with the change drum 36.

The first junction member 57 is formed into a tubular shape (in this embodiment, into a cylindrical shape). One end of the first junction member 57 is continuous to the tubular section 41 of the change cam 34. The first junction member 57 projects from the tubular section 41 of the change cam 34 toward the rotation sensor 52.

In addition, part of the first junction member 57 is disposed in the space inwardly of the change cam 34, and the remaining part of the first junction member 57 projects from the change cam 34. The first junction member 57 is disposed inward in radial direction R1 with respect to the plurality of pins 42.

The outside diameter (the largest outside diameter) of the first junction member 57 is smaller than the outside diameter (the largest outside diameter) of the change cam 34. The first junction member 57 is coaxial with the second junction member 58, the fixing member 35, the change cam 34, and the change drum 36. That is, rotational axis X1 of the change drum 36 coincides with the rotational axes of the first junction member 57, the second junction member 58, the fixing member 35, and the change cam 34.

On the end face of the first junction member 57 directing to the rotation sensor 52, a convex section 75 is disposed. The convex section 75 will be described later in detail.

The first junction member 57 having the above structure is coupled to the second junction member 58 so as to be integrally rotatable about rotational axis X1. Further, the second junction member 58 is coupled to the rotor 53 of the rotation sensor 52 so as to be integrally rotatable about rotational axis X1. In this embodiment, although the relative displacement between the first junction member 57 and the second junction member 58 in circumferential direction C1 is prevented, the relative displacement between the first junction member 57 and the second junction member 58 in axis direction S1 and the relative displacement between the first junction member 57 and the second junction member 58 in radial direction R1 can be allowed. With this structure, the first junction member 57 and the second junction member 58 are coupled to each other in a state where the relative displacement between the first junction member 57 and the second junction member 58 in circumferential direction C1 is reliably prevented without increasing the mutual assembling accuracy that much.

The second junction member 58 is integrally rotatably coupled to the first junction member 57, and is disposed between the first junction member 57 and the transmission cover 22 in axis direction S1. The intermediate portion of the second junction member 58 in axis direction S1 expands in radial direction R1.

The second junction member 58 has a base end 69, a second flange 70, and the distal end 71. The base end 69, the second flange 70, and the distal end 71 are aligned in this order along axis direction S1.

The base end 69 is formed into a disc shape having a predetermined thickness. The base end 69 is fitted on the inner peripheral face of the first junction member 57 of the first junction member 57. In this embodiment, the base end 69 is fitted on the inner peripheral face of the first junction member 57 in a clearance fit state. The base end 69 faces the head 35a of the fixing member 35 in the first junction member 57. The base end 69 is continuous to the second flange 70.

The second flange 70 is formed into a plate shape, and in this embodiment, is formed into a disc shape. The second flange 70 is sandwiched between the base end 69 and the distal end 71. The second flange 70 overlaps with the first junction member 57, and the opposite faces of the second flange 70 and the first junction member 57 are in contact with each other.

With the above structure, one side face of the second flange 70 that directs to the first junction member 57 and is brought into contact with the first junction member 57 and the outer peripheral face of the base end 69 form a received section 72 received by the first junction member 57. By the contact between the base end 69 and the first junction member 57, the relative displacement amount between the first junction member 57 and the second junction member 58 in radial direction R1 is prevented in a predetermined range.

The first junction member 57 and the second junction member 58 are coupled by using a third fitting structure 74 so as to be integrally rotatable about rotational axis X1.

The third fitting structure 74 couples the first junction member 57 and the second junction member 58 by fitting. In the third fitting structure 74, the gap (position adjustable amount) between the first junction member 57 and the second junction member 58 in radial direction R1 is larger than the gap between the first junction member 57 and the second junction member 58 in circumferential direction C1. In addition, the third fitting structure 74 couples the first junction member 57 and the second junction member 58 so as to be relatively displaceable in axis direction S1 and in radial direction R1. The third fitting structure 74 is disposed in the interior of the transmission cover 22.

The third fitting structure 74 includes the convex section 75 formed in one of the first junction member 57 and the second junction member 58, and a concave section 76 formed in the other of the first junction member 57 and the second junction member 58.

The convex section 75 is spaced from the concave section 76 from rotational axis X1 in radial direction R1, and is fitted in the concave section 76.

In this embodiment, the convex section 75 is integrated with the first junction member 57, and projects from the end face of the first junction member 57 directing to the rotation sensor 52 toward the rotation sensor 52 in parallel with axis direction S1. The convex section 75 is formed into a pillar shape, and is formed into a rectangular shape in the cross section orthogonal to axis direction S1.

In this embodiment, the concave section 76 is formed in the second flange 70 of the second junction member 58, and is recessed at a portion of the outer peripheral edge of the second flange 70 toward rotational axis X1. The concave section 76 penetrates through the second flange 70 in parallel with axis direction S1. The concave section 76 is formed into a rectangular shape in the cross section orthogonal to axis direction S1.

In this embodiment, the relative rotation of the convex section 75 with respect to the concave section 76 about circumferential direction C1 is substantially prevented. On the other hand, the convex section 75 can be allowed to be displaced from the concave section 76 in radial direction R1.

More specifically, referring to FIGS. 5 and 6, the R1 direction dimension of the convex section 75 is R1 direction dimension A11, and the C1 direction dimension of the convex section 75 is C1 direction dimension B11. In addition, the R1 direction dimension of the concave section 76 is R1 direction dimension A12, and the C1 direction dimension of the concave section 76 is C1 direction dimension B12.

In this embodiment, A12>A11. In addition, B12>B11. Further, (A12−A11)>(B12−B11). That is, in the third fitting structure 74, the gap between the convex section 75 and the concave section 76 in radial direction R1 (A12−A11) is larger than the gap between the convex section 75 and the concave section 76 in circumferential direction C1 (B12−B11).

In the above structure, while the transmission error of the convex section 75 and the concave section 76 in the third fitting structure 74 in circumferential direction C1 can be prevented, the dimension error of the convex section 75 and the concave section 76 in the third fitting structure 74 in radial direction R1 can be easily absorbed.

In this embodiment, on both sides in circumferential direction C1 of the portion of the second flange 71 in which the concave section 76 is formed, reinforcing pieces 80 are formed. The reinforcing pieces 80 are small pieces projecting from the outer peripheral face of the second flange 71 to outside in radial direction R1, thereby forming part of the concave section 76. In addition, the reinforcing pieces 80 are received by the end face of the first junction member 57. Thus, the reinforcing pieces 80 function as stoppers that prevent the second junction member 58 from excessively entering the large-diameter section 41c with respect to the first junction member 57.

The rotative movement that is transmitted through the third fitting structure 74 to the second flange 70 of the second junction member 58 is transmitted to the rotor 53 via the distal end 71 of the second junction member 58.

The distal end 71 is disposed at one end of the junction body 51, and projects from the second flange 70 toward the rotor 53. The distal end 71 is a rotating position index in which a rotating position is detected by the rotation sensor 52. The distal end 71 is formed into a non-circular shape in the cross section orthogonal to axis direction S1, and in this embodiment, is formed into a substantially rectangular shape. The distal end 71 has a shape corresponding to the shape of the hole 53a of the rotor 53, and is inserted into the hole 53a. The gap between the hole 53a and a distal end 71a in circumferential direction C1 is smaller than the gap between the hole 53a and the distal end 71 in radial direction R1. Thus, the second junction member 58 and the rotor 53 are coupled to be integrally rotatable about rotational axis X1, and a predetermined amount of displacement in radial direction R1 can be allowed.

In addition, the second junction member 58 is sandwiched between the first junction member 57 and the rotor 53 in axis direction S1, so that the second junction member 58 can be prevented from being accidentally displaced in axis direction S1.

In addition, the first junction member 57 that is one end of the junction body 51 and the change cam 34 are fixed to the change drum 36 by using the fixing member 35 coaxial with rotational axis X1, and the distal end 71 of the second junction member 58 that is the other end of the junction body 51 and the rotor 53 of the rotation sensor 52 are coupled to each other on the same axis as rotational axis X1. On the other hand, the first fitting structure 44 for transmitting rotation in the junction body 51 is eccentric with respect to rotational axis X1.

Referring to FIGS. 3 and 5, with the above structure, the driving force that is transmitted from the rider to the change lever 33 is transmitted to the change cam 34 via the pins 42 of the change cam 34. Then, the rotational force of the change cam 34 is transmitted to the change drum 36 via the first rotation prevention member 45 and the fixing member 35. In addition, the rotational force of the change drum 36 is transmitted to the first junction member 57 of the junction body 51 via the first rotation prevention member 45 and the change cam 34. Further, the rotational force that is transmitted to the first junction member 57 is transmitted to the second junction member 58 via the third fitting structure 74, and is then transmitted to the rotor 53 of the rotation sensor 52. Thereafter, the rotative movement of the rotor 53 cooperating with the rotative movement of the change drum 36 is detected by the detector 54.

With the above structure, in the engaging portion of the second junction member 58 of the junction body 51 and the change cam 34 (third fitting structure 74), the gap in radial direction R1 is larger than the gap in circumferential direction C1. Likewise, in the engaging portion of the junction body 51 and the rotor 53, the gap in radial direction R1 is larger than the gap in circumferential direction C1. Thus, while the transmission error of the rotational force can be prevented, the error in radial direction R1 can be allowed.

More specifically, the base end 69 of the second junction member 58 of the junction body 51 is inserted and supported in the large-diameter section 41c (screw accommodation section) of the change cam 34. The large-diameter section 41c is formed into a tubular shape to form the third fitting structure 74 at the end thereof on the second supporting member 58 side. In a state where the base end 69 of the second supporting member 58 of the junction body 51 is inserted into the large-diameter section 41c of the change cam 34, the convex section 75 of the third fitting structure 74 is opposite to both sides of the concave section 76 in circumferential direction C1. Thus, the junction body 51 can be prevented from being rotated in circumferential direction C1 with respect to the change cam 34.

Into the first junction member 57 integrated with the change cam 34, the second junction member 58 of the junction body 51 is inserted, and the first junction member 57 projects toward the rotation sensor 52 in axis direction X1 from the projecting positions of the pins 42. In this embodiment, the first junction member 57 projects toward the rotation sensor 52 in axis direction X1 from the ends of the pins 42. By disposing the first junction member 57 inwardly of the pins 42 in this manner, the axial direction dimension of the junction body 51 can be shortened.

In the second junction member 58 of the junction body 51, the second flange 71 that is larger than the diameter of the large-diameter section 41c (screw head accommodation section) is formed on the rotation sensor 52 side with respect to the base end 69. Thus, the second junction member 58 of the junction body 51 and the change cam 34 can be abutted in axis direction X1, so that the junction body 51 can be easily aligned with the change cam 34 in axis direction S1.

The axis direction dimension of the large-diameter section 41c formed on the inner peripheral face of the change cam 34 and the first junction member 57 is larger than the total axis direction dimension of the head 35a of the fixing member 35 and the base end 69 of the second junction member 58 of the junction body 51. Thus, both of the head 35a of the fixing member 35 and the base end 69 can be accommodated in the large-diameter section 41c in a state where they are aligned in axis direction X1. By aligning the fixing member 35 and the junction body 51 in axis direction X1 in this manner, the rotational axis of the rotor 53 can be coaxial with the change drum 34. That is, like the pins 42 of the change cam 34, even when the outer periphery at one end in the axis direction of the change drum 36 (rotation member) is used for power transmission, the rotor 53 can be coaxial with rotational axis X1 of the change drum 36.

As described above, according to this embodiment, the rotation of the change drum 36 can be transmitted to the rotor 53 of the rotation sensor 52 via the junction body 51 separatable from both of the change drum 36 and the rotation sensor 52. Thus, the change drum 36 and the rotation sensor 52 can be sufficiently spaced from each other. By coupling the change drum 36 and the rotation sensor 52 via the junction body 51 in this manner, the shape limit on both of the change drum 36 and the rotation sensor 52 can be relaxed. As a result, the degree of freedom of the design of the change drum 36 and the rotation sensor 52 can be improved. In addition, the rotor 53 and the detector 54 are supported by one housing 55. Thus, the positional relation between the rotor 53 and the detector 54 can be set with high accuracy, and as a result, the detection accuracy of the change drum 36 can be improved. Further, the junction body 51 is coaxial with rotational axis X1. Thus, the junction body 51 can be supported by at least one of the change drum 36 and the rotor 53 (in this embodiment, by both), so that an exclusive structure for rotatably supporting the junction body 51 can be eliminated. As a result, the detection error in the transmission of rotative movement can be reduced. That is, the detection accuracy of the change drum 36 can be easily improved. Further, the structure of the rotation detecting device 25 can be made simpler.

In addition, according to this embodiment, the junction body 51 is supported by the change drum 36 on one side in axis direction S1, and is supported by the rotor 53 of the rotation sensor 52 on the other side in axis direction S1. With this structure, the change drum 36 and the rotation sensor 52 can be spaced in axis direction S1 more largely. For example, by spacing the change drum 36 and the rotation sensor 52 in axis direction S1, the rotation sensor 52 can be disposed by preventing the interference between the pins 42 disposed around the change drum 36 and the change drum 36. In addition, the rotation sensor 52 can be supported by the transmission cover 22 spaced from the change drum 36 in axis direction S1. Further, the junction body 51 is supported at both ends thereof. Thus, the junction body 51 can be supported by a simple structure without requiring no exclusive bearings.

According to this embodiment, the pins 42 as functioning portions having a function different from the supporting of the junction body 51 are disposed on the outer periphery of the tubular section 41 of the change cam 34. With this structure, the supporting function of the junction body 51 can be provided inwardly of the pins 42 in radial direction R1 (tubular section 41). As a result, the portions in which the pins 42 as functioning portions are disposed and the portion supporting the junction body 51 can be achieved by one change cam 34 (tubular section 41). Thus, component sharing is enabled.

According to this embodiment, the pins 42 are formed on the outer periphery of the tubular section 41 of the change cam 34 and transmit the rotational force to the change cam 34, and the junction body 51 is supported by the change cam 34 inward in radial direction R1 with respect to the pins 42. With this structure, the junction body 51 can be supported by the change cam 34 without interfering with the pins 42.

According to this embodiment, the change drum 36 shifts the shift fork 49 included in the gear transmission mechanism 9. In addition, the rotational force that is provided from the rider is transmitted to the change drum 36 via the pins 42. Further, the rotation sensor 52 can detect the angular position of the change drum 36 via the junction body 51. With this structure, in the rotation detecting device 25, the junction body 51 is disposed on the side in which the pins 42 are disposed (or in the portion between the change drum 36 and the rotation sensor 52), so that the rotation of the change drum 36 can be transmitted to the rotation sensor 52 via the junction body 51. By disposing the junction body 51 in this manner, the rotation sensor 52 can also be disposed on the side in which the pins 42 are disposed. Further, the design change of the change drum 36 and the rotation sensor 52 due to the design-changed pins 42 can be prevented. Thus, the degree of freedom of the design of the rotation detecting device 25 for detecting a gear position (the position of the change drum 36) can be made higher.

According to this embodiment, the housing 55 of the rotation sensor 52 is mounted on the transmission cover 22 removable from the casing main body 21. For example, in a structure that directly fixes the housing 55 of the rotation sensor 52 to the casing main body 21 accommodating the change drum 36, the casing main body 21 holding the rotation sensor 52 and accommodating the change drum 36 is also required to be design-changed at design-changing the rotation sensor 52. On the contrary, according to this embodiment, even when the transmission cover 22 holding the rotation sensor 52 is required to be design-changed at design-changing the rotation sensor 52, the casing main body 21 accommodating the change drum 36 is not required to be design-changed or is required to be design-changed at minimum. Thus, the rotation detecting device 25 can be modified more easily.

According to this embodiment, in the first fitting structure 44, the gap between the first junction member 57 of the junction body 51 and the change drum 36 in radial direction R1 is larger than the gap between the first junction member 57 of the junction body 51 and the change drum 36 in circumferential direction C1. With this structure, the error of the mounting position when the junction body 51 is mounted on the change drum 36 can be absorbed by the relative displacement between the first junction member 57 of the junction body 51 and the change drum 36 in radial direction R1. Thus, the accuracy of the setting of the relative position between the junction body 51 and the change drum 36 is not required to be excessively increased. This can reduce the time and labor in assembling the rotation detecting device 25. Since the rotation detecting device 25 is used for detecting the rotation of the change drum 36, the relative position displacement between the junction body 51 and the change drum 36 in circumferential direction C1 is not preferable from the viewpoint of precise rotation detection. On the other hand, the relative position displacement between the junction body 51 and the change drum 36 in radial direction R1 is not a significant problem as compared with the relative position displacement between the junction body 51 and the change drum 36 in circumferential direction C1. Thus, the accuracy of the setting the relative position between the junction body 51 and the change drum 36 is not required to be excessively increased, and the detection accuracy of the change drum 36 detected by the rotation sensor 52 can be made higher.

According to this embodiment, the first fitting structure 44 couples the change drum 36 and the change cam 34 at only one position in circumferential direction C1. Further, the third fitting structure 74 couples the first junction member 57 and the second junction member 58 at only one position in circumferential direction C1. In this way, the engaging positions of the first junction member 57 and the second junction member 58 are rotationally asymmetric, so that the first junction member 57 and the second junction member 58 can be prevented from engaging with each other at the position other than the one position. Thus, the change drum 36 and the rotor 53 do not engage with each other at the position displaced from the original setting position in circumferential direction C1, so that erroneous assembling can be prevented. In addition, with such a structure, the rotative movement of the change drum 36 can be transmitted to the rotor 53 of the rotation sensor 52 via the change cam 34 and the junction body 51 more precisely. Thus, the change drum 36 can be rotation-detected by the rotation sensor 52 more precisely and easily.

According to this embodiment, the sensor holding section 31 holding the housing 55 of the rotation sensor 52 is disposed in the cover main body 27 of the transmission cover 22. In addition, the screw insertion holes 28a for fixing the housing 55 to the transmission cover 22 are disposed sidewardly of the sensor holding section 31 (or at the positions different from the position of the sensor holding section 31). With such a structure, the housing 55 can be fixed to the transmission cover 22 in a state where the housing 55 of the rotation sensor 52 can be prevented from being rotated.

According to this embodiment, the detector 54 of the rotation sensor 52 is fixed to the transmission cover 22. Thus, by removing the transmission cover 22 from the casing main body 21 in the event of the failure of the rotation sensor 52, the rotation sensor 52 can be easily replaced. In addition, the electric structure of the rotation sensor 52 is held by the transmission cover 22. Thus, the electric connection in the casing main body 21 is not required, so that the influence of the assembling error can be prevented. Further, since the rotation sensor 52 is a non-contact sensor detecting the change of the magnetic flux, any failure due to the contacting operation can be prevented.

According to this embodiment, the first junction member 57 of the junction body 51 is integrated with the change cam 34 by using the single member. Thus, the position error in circumferential direction C can be prevented from being caused between the change cam 34 and the first junction member 57. By reducing the number of coupling structures between the change drum 36 and the detector 54 in this manner, the rotating position detection error in circumferential direction C1 can be reduced more reliably.

According to this embodiment, the junction body 51 is separated from the change drum 36, and is disposed in series with the change drum 36 and the rotation sensor 52. Thus, the influence on the change drum 36 when the junction body 51 is design-changed is small. In addition, the junction body 51 can be disposed later in the change drum 36 in which the junction body 51 is not provided. Further, in a case in which a component is disposed around the change drum 36 before the junction body 51 is mounted on the change drum 36, the junction body 51 can be mounted after the component is disposed on the change drum 36. Thus, the degree of freedom of the design of the rotation detecting device 25 and the general-purpose properties of the change drum 36 can be made higher.

According to this embodiment, the junction body 51 includes the junction members 57 and 58, which are disposed in series in axis direction S1. With this structure, by forming the junction body 51 by the junction members 57 and 58, the degree of freedom of the setting of the shapes of the junction members 57 and 58 can be made higher. Thus, the degree of freedom of the design of the rotation detecting device 25 can be made higher.

According to this embodiment, the first junction member 57 and the second junction member 58 including the distal end 71 coupled to the rotation sensor 52 are disposed as the junction member. With this structure, the degree of freedom of the setting of the shapes of the junction members 57 and 58 can be made higher while the number of junction members can be minimized. Thus, the degree of freedom of the design of the rotation detecting device 25 can be made higher while the number of components can be reduced.

According to this embodiment, the third fitting structure 74 for integrally rotatably coupling the first junction member 57 and the second junction member 58 is disposed. With this structure, by a simple structure, the first junction member 57 and the second junction member 58 are integrally rotatable.

According to this embodiment, the third fitting structure 74 includes the convex section 75 formed in one of the first junction member 57 and the second junction member, and the concave section 76 formed in the other of the first junction member 57 and the second junction member 58 and coupled to the convex section 75. The gap between the convex section 75 and the concave section 76 in circumferential direction C1 is smaller than the relative movable amount between the convex section 75 and the concave section 76 in axis direction S1. With this structure, in the third fitting structure 74, the first junction member 57 and the second junction member 58 can be prevented from being displaced in circumferential direction C1 more reliably. Thus, the junction body 51 can transmit the rotating position of the change drum 36 to the rotation sensor 52 with higher accuracy. In addition, the relative position displacement between the first junction member 57 and the second junction member 58 in axis direction S1 can be allowed. Thus, the dimension accuracy of the first junction member 57 and the second junction member 58 is not required to be excessively increased. Also, the relative position displacement between the first junction member 57 and the second junction member 58 in axis direction S1 does not significantly affect the accuracy of the rotating position detection. Thus, the accuracy of the rotating position detection can be prevented from being affected.

According to this embodiment, the length of the concave section 76 is larger than the length of the convex section 75 in radial direction R1. With this structure, even when the convex section 75 is displaced from the concave section 76 in radial direction R1, the coupled state of the convex section 75 and the concave section 76 can be maintained. That is, the relative position displacement between the first junction member 57 and the second junction member 58 in radial direction R1 can be allowed, so that the dimension accuracy of the first junction member 57 and the second junction member 58 is not required to be excessively increased.

According to this embodiment, the second junction member 58 includes the distal end 71 that directs in the direction opposite to the portion thereof opposite to the first junction member 57 (or in the left direction) and is opposite to the rotation sensor 52. The distal end 71 is coupled to the rotor 53 of the rotation sensor 52. With this structure, the length that is occupied by the second junction member 58 and the rotor 53 with respect to axis direction S1 can be made shorter.

According to this embodiment, the change cam 34 is disposed as an intermediate member coupled to at least one of the first junction member 57 and the change drum 36 (in this embodiment, to both). With this structure, the change cam 34 (in particular, the pins 42) can be disposed around the change drum 36. Thus, the degree of freedom of the design of the rotation detecting device 25 can be made higher.

According to this embodiment, the tubular section 41 of the change cam 34 is integrated with the first junction member 57 by using the single member. With this structure, the number of components of the rotation detecting device 25 can be reduced. In addition, the tubular section 41 of the change cam 34 and the first junction member 57 can be prevented from being displaced from each other in circumferential direction C1 more reliably. Thus, the rotative movement of the change drum 36 can be transmitted to the rotation sensor 52 more precisely.

According to this embodiment, the convex section 75 is directly formed in the change cam 34. Thus, the number of components can be reduced as compared with a case that the convex section 75 is separated from the change cam 34.

According to this embodiment, the change cam 34 integrally rotatably couples the first junction member 57 and the change drum 36. With this structure, the change cam 34 can be used as a coupling member coupling the first junction member 57 and the change drum 36.

According to this embodiment, the first rotation prevention member 45 integrally rotatably coupling the change cam 34 and the change drum 36 is held by one of the change cam 34 and the change drum 36, and is inserted into the long hole 47 formed in the other of the change cam 34 and the change drum 36. The gap between the long hole 47 and the first rotation prevention member 45 in circumferential direction C1 is smaller than the gap between the long hole 47 and the first rotation prevention member 45 in radial direction R1. With this structure, even when the first rotation prevention member 45 is displaced from the long hole 47 in radial direction R1, the coupled state of the first rotation prevention member 45 and the long hole 47 can be maintained. Thus, the relative position displacement between the first rotation prevention member 45 and the long hole 47 in radial direction R1 can be allowed, so that the dimension accuracy of the change cam 34 and the change drum 36 is not required to be excessively increased.

According to this embodiment, the change cam 34 is a rotational force transmission member for transmitting the driving force that rotates the change drum 36 to the change drum 36. With this structure, the junction body 51 can be disposed closely to the rotational force transmission member (change cam 34). Thus, the junction body 51 can more precisely transmit the rotative movement of the change drum 36 member to the rotation sensor 52 in a state where an error due to the twisted junction body 51 when the driving force is received from the rotational force transmission member (change cam 34) can be prevented.

According to this embodiment, the rotation sensor 52 is disposed in the transmission cover 22 removable from the casing main body 21. Thus, the rotation sensor 52 is not required to be disposed in the casing main body 21, so that the general-purpose properties of the casing main body 21 can be made higher.

According to this embodiment, the second junction member 58 is integrally rotatably coupled to the first junction member 57, and is disposed between the first junction member 57 and the transmission cover 22 in axis direction S1. With this structure, by interposing the second junction member 58 between the first junction member 57 and the transmission cover 22, the second junction member 58 can be prevented from coming off the first junction member 57. Thus, an exclusive structure for preventing the second junction member 58 from being displaced from the first junction member 57 in axis direction S1 is not required to be disposed. Thus, the structure of the junction body 51 can be made simpler.

According to this embodiment, the rotation sensor 52 is a gear position sensor for detecting the operated state of the transmission mechanism 9. With this structure, the degree of freedom of the design of the transmission mechanism 9 used in the motor and the general-purpose properties of the change drum 36 can be made higher.

<Second Embodiment>

A second embodiment of the present invention will now be described. The structure of the second embodiment that is different from that of the first embodiment will be mainly described below, and the detailed description of the same structure as the first embodiment is omitted by indicating the same reference numerals in the drawings.

Figure 8:
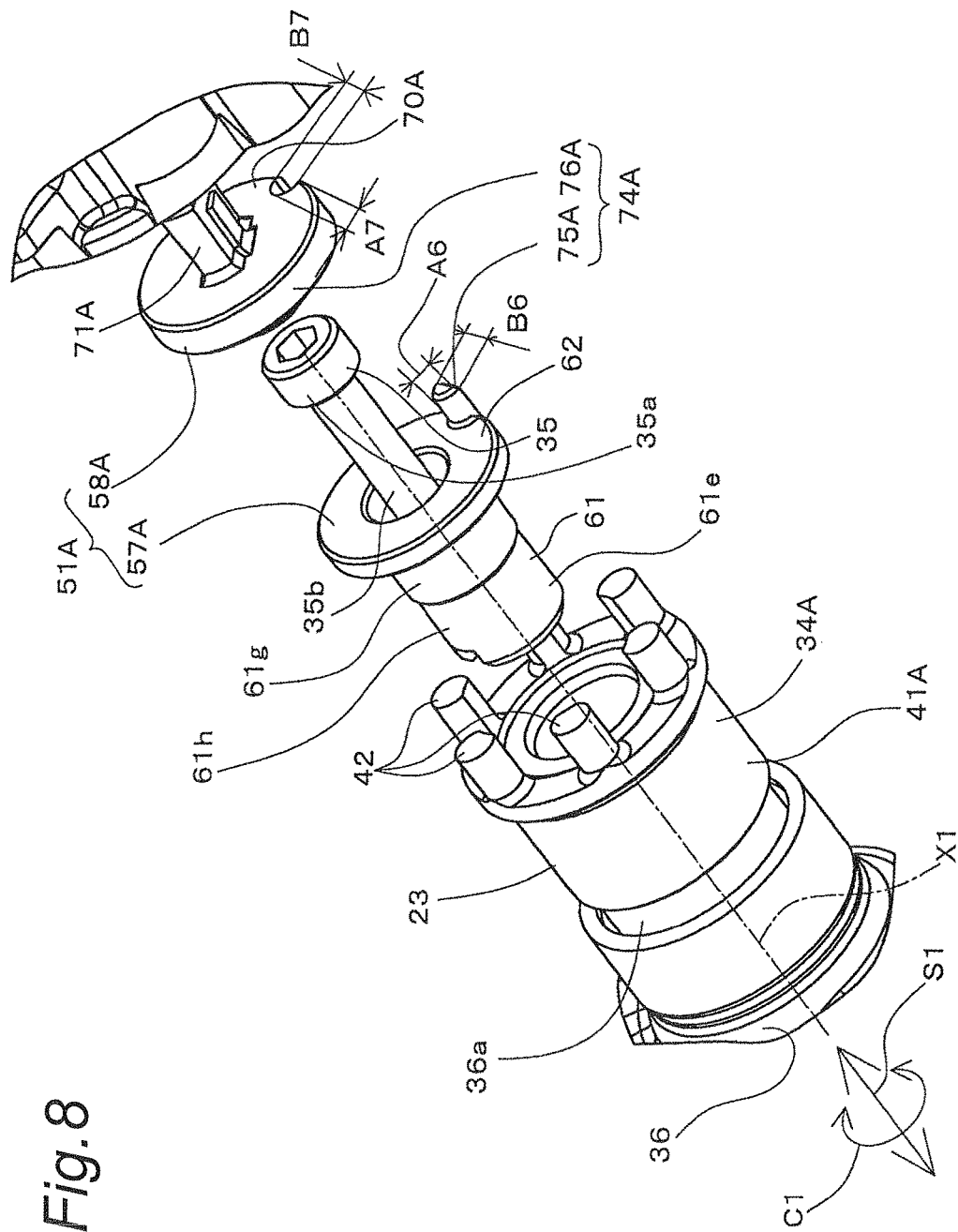
FIG. 8 is an exploded perspective view of a main portion according to a second embodiment of the present invention.
Figure 9:
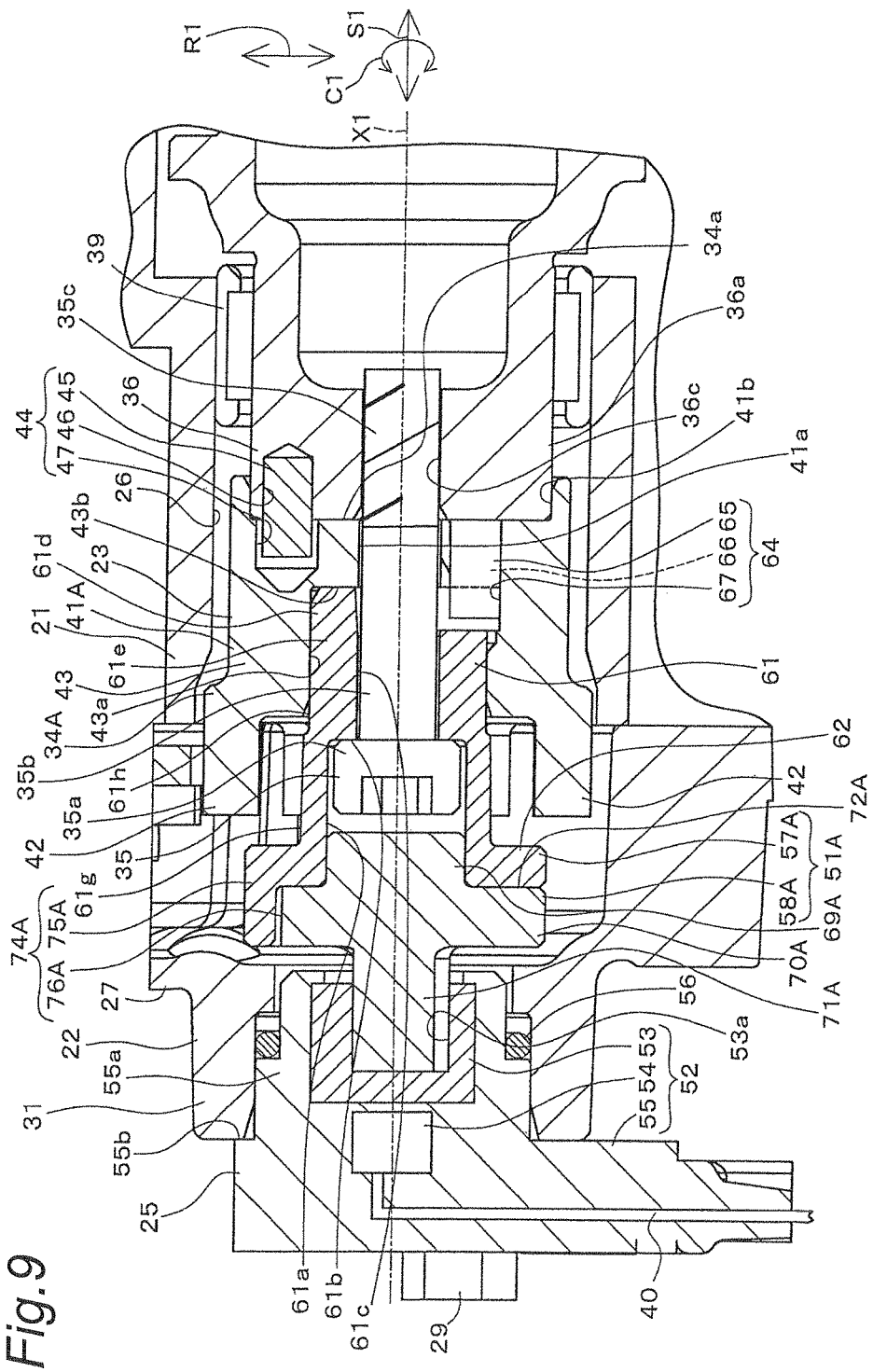
FIG. 9 is a cross-sectional view of the main portion according to the second embodiment of the present invention.
Figure 10:
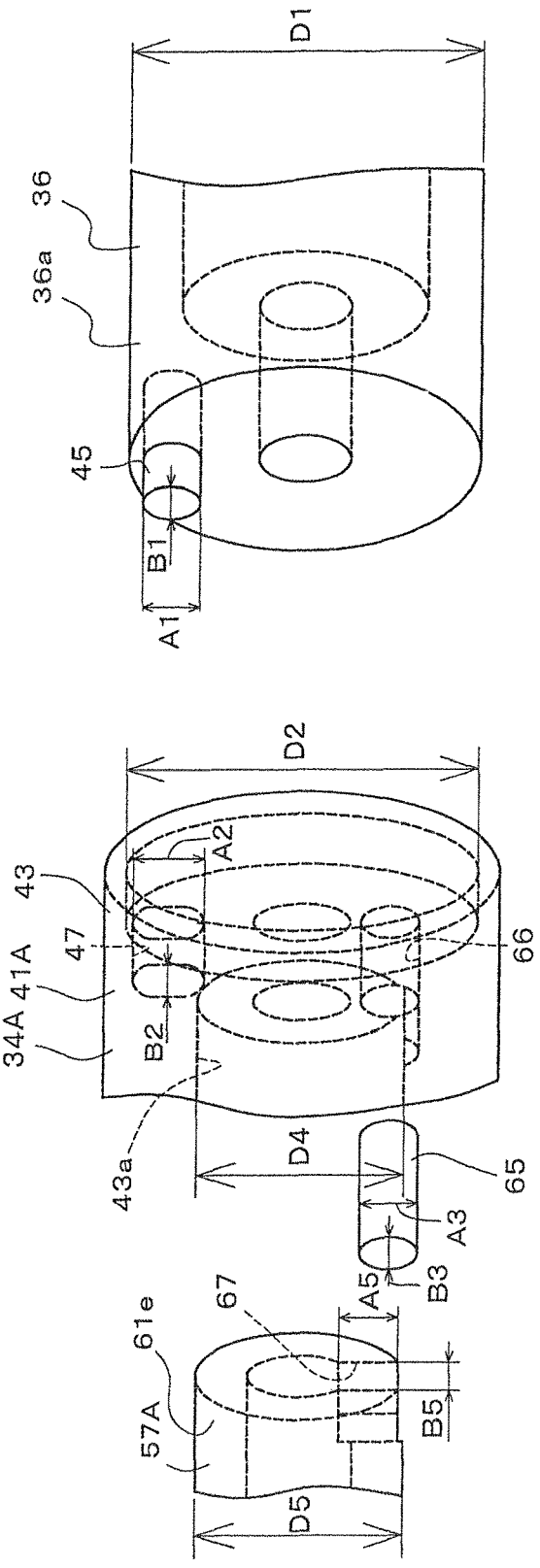
FIG. 10 is a schematic exploded perspective view of the main portion according to the second embodiment of the present invention.

FIG. 8 is an exploded perspective view of a main portion according to the second embodiment of the present invention. FIG. 9 is a cross-sectional view of the main portion according to the second embodiment of the present invention. FIG. 10 is a schematic exploded perspective view of the main portion according to the second embodiment of the present invention. In the first embodiment, the change cam 34 and the first junction member 57 are an integrally molded article. As illustrated in FIGS. 8 to 10, in the second embodiment, a change cam 34A and a first junction member 57A are separated from each other. This point in the second embodiment is mainly different from the first embodiment.

The change cam 34A has a tubular section 41A, and the plurality of pins 42.

In this embodiment, the tubular section 41A is a member formed into a cylindrical shape, and is integrally rotatably coupled to a change drum 36A via the first fitting structure 44. The plurality of pins 42 project from the outer periphery at one end of the tubular section 41A. A junction body 51A is supported by the change cam 34A inward in radial direction R1 with respect to the pins 42.

The tubular section 41A includes a supporting section 43 into which a supported section 61e of the later-described first junction member 57A of the junction body 51A is inserted. The supporting section 43 is an annular groove portion, and is opened toward the rotation sensor 52 (to the left side). An inner peripheral face 43a of the supporting section 43 is formed into a cylindrical shape. In addition, a bottom 43b of the supporting section 43 is an annular step, and extends n and in radial direction R1 from the inner peripheral face 43a of the supporting section 43.

The end of the junction body 51A on the change cam side is disposed in the interior of the change cam 34A.

In this embodiment, the junction body 51A is supported at both ends thereof by the change drum 36 and the rotation sensor 52. More specifically, one end of the junction body 51A is supported by the change drum 36 via the change cam 34A. In addition, the other end of the junction body 51A is supported by the rotor 53 of the rotation sensor 52. The junction body 51A is disposed in series with the change drum 36 and the rotation sensor 52, and in this embodiment, is separated from the change drum 36.

The junction body 51A is supported at both ends thereof in axis direction S1 in such a manner that one of the ends thereof is inserted into the rotor 53 of the rotation sensor 52 and that the other end thereof is inserted into the change cam 34A. In addition, the junction body 51A has a second engaging structure 64 engaging with the rotor 53 of the rotation sensor 52 in a state where relative rotation about rotational axis X1 is prevented. Likewise, the junction body 51A has the first engaging structure 44 engaging with the change cam 34A in a state where relative rotation about rotational axis X1 is prevented. Thus, the rotative movement of the change drum 36 is transmitted to the rotor 53 via the junction body 51A.

The junction body 51A includes the first junction member 57A and a second junction member 58A, which are disposed in series in axis direction S1.

The first junction member 57A is coupled to the change drum 36 via the change cam 34A so as to be integrally rotatable about rotational axis X1. In addition, the first junction member 57A supports the second junction member 58A.

The first junction member 57A is formed into a tubular shape. The outside diameter of the first junction member 57A is increased stepwise from the end thereof on the change drum side toward the end thereof on the rotation sensor side. Part of the first junction member 57A is disposed in the space inwardly of the change cam 34A, and the remaining part of the first junction member 57A projects from the change cam 34A.

The first junction member 57A is formed into a tubular shape. One end of the first junction member 57A is disposed in the interior of the supporting section 43 of the tubular section 41A of the change cam 34A. The first junction member 57A projects from the tubular section 41A of the change cam 34A toward the rotation sensor 52.

The outside diameter (the largest outside diameter) of the first junction member 57A is smaller than the outside diameter (the largest outside diameter) of the tubular section 41A of the change cam 34A. The first junction member 57A is disposed inward in radial direction R1 with respect to the plurality of pins 42.

The first junction member 57A has a main body 61 formed in a cylindrical shape, and a first flange 62 disposed at one end of the main body 61.

The main body 61 is fixed to the change cam 34A by using the fixing member 35. Most of the main body 61 is disposed in the interior of the change cam 34A. In addition, the main body 61 accommodates a portion of the fixing member 35.

The main body 61 has a large-diameter section 61a, a step 61b, and a screw insertion hole 61c in the inner periphery of the main body 61, and the supported section 61e at the end of the main body 61 on the change drum 36 side.

The large-diameter section 61a accommodates the head 35a of the fixing member 35. The large-diameter section 61a is formed into a cylindrical shape having a fixed diameter, and extends along axis direction S1. The large-diameter section 61a is enclosed by the pins 42 of the change cam 34A. The end of the large-diameter section 61a on the rotation sensor 52 side is opened toward the rotation sensor 52. On the other hand, at the end of the large-diameter section 61a on the change drum 36 side, the step 61b is formed. The step 61b receives the head 35a of the fixing member 35, and extends inward in radial direction R1 from the large-diameter section 61a.

The step 61b is a face extending in the direction orthogonal to rotational axis X1. The step 61b is enclosed by the pins 42 of the change cam 34A. The screw insertion hole 61c extends from the step 61b toward the change drum 36.

Through the screw insertion hole 61c, the shaft 35b of the fixing member 35 is inserted. The screw insertion hole 61c is enclosed by the tubular section 41A of the change cam 34A. The shaft 35b of the fixing member 35 penetrates through the screw insertion hole 61c. Further, the male screw 35c formed at the end of the shaft 35b is screwed into the female screw 36c formed at the one end 36a of the change drum 36. Thus, the fixing member 35 is fixed to the change drum 36.

The fixing member 35 fastens the first junction member 57A to the change cam 34A (change drum 36). More specifically, the supported section 61e of the main body 61 of the first junction member 57A is inserted into the supporting section 43 of the change cam 34A. The supported section 61e is disposed in the first junction member 57A on the change drum 36 side, and is fitted on the inner peripheral face of the supporting section 43 of the tubular section 41A, so that movement in radial direction R1 with respect to the change drum 36 is prevented.

The supported section 61e is a cylindrical portion formed in the portion of the main body 61 (junction body 51) on the change drum 36 side. The outer peripheral face of the supported section 61e is fitted on the inner peripheral face of the supporting section 43. In addition, the end face (right end face) of the supported section 61e is received by the bottom 43b of the supporting section 43. Further, the head 35a of the fixing member 35, the supported section 61e, the bottom 43b of the supporting section 43, and the change drum 36 are aligned in parallel with axis direction S1. Thus, the supported section 61e of the first junction member 57A and the change cam 34 are fastened by the head 35a of the fixing member 35 and the change drum 36. As a result, the supported section 61e of the first junction member 57A is fixed to the change drum 36.

With the above structure, the tubular section 41A of the change cam 34A is fixed to the change drum 36 in such a manner that the fixing member 35 that is separated from the change drum 36 and fixes the tubular section 41 to the change drum 36 is inserted through the inner periphery of the tubular section 41A. The supported section 61e of the first junction member 57A is fitted on the inner peripheral face of the tubular section 41A through which the shaft 35b of the fixing member 35 is inserted.

With such a structure, the fixing member 35 is enclosed by the first junction member 57, and the first junction member 57 is enclosed by the change cam 34A. In this way, the structure fixing the change cam 34A to the change drum 36 and the structure fixing the first junction member 57A to the change cam 34A (change drum 36) can be formed in the interior of the change cam 34A. Further, the change cam 34A (change drum 36) and the first junction member 57A are coupled by using the second fitting structure 64 so that relative rotation about rotational axis X1 (relative rotation in circumferential direction C1) is prevented.

The second fitting structure 64 couples the change cam 34A (change drum 36) and the first junction member 57A of the junction body 51A by fitting. In the second fitting structure 64, the gap (position adjustable amount) between the first junction member 57 and the change cam 34A (change drum 36) in radial direction R1 is larger than the gap between the first junction member 57A and the change cam 34A (change drum 36) in circumferential direction C1.

The second fitting structure 64 includes a second rotation prevention member 65, a hole 66 formed in one of the first junction member 57A and the change cam 34A, and a long hole 67 formed in the other of the first junction member 57A and the change cam 34A.

The second rotation prevention member 65 is, for example, a columnar pin member. By using the second rotation prevention member 65, the relative rotation between the first junction member 57A and the change cam 34 about rotational axis X1 is prevented. The second rotation prevention member 65 is disposed inwardly of the change cam 34A and the first junction member 57A at the position spaced in radial direction R1 from rotational axis X1 and at the position different from the first rotation prevention member 45 in circumferential direction C1.

In this embodiment, the second rotation prevention member 65 is fitted in the hole 66 that is formed on one end face 34a side of the change cam 34A on the change drum 36 side and is opened toward the one end face 34a. The hole 66 is adjacent to the screw insertion hole 41a, and penetrates through one end of the tubular section 41A in parallel with axis direction S1. The second rotation prevention member 65 is fitted and fixed in the hole 66, and is prevented from being displaced from the hole 66 in circumferential direction C1.

In this embodiment, the second rotation prevention member 65 is fitted in the long hole 67 (rotation prevention section) that is formed at one end of the supported section 61e of the first junction member 57A on the change drum 36 side and is opened toward one end face of the first junction member 57A. The long hole 67 is fitted on the second rotation prevention member 65 disposed on the one end face 34a side of the supporting section 43 of the change cam 34A to prevent relative movement in circumferential direction C1 with respect to the change drum 36.

The long hole 67 is formed into a rectangular shape that elongatedly extends along radial direction R1 in the cross section orthogonal to axis direction S1. The C1 direction dimension of the long hole 67 is substantially the same as the diameter (C1 direction dimension) of the second rotation prevention member 65. The radial direction R1 dimension of the long hole 67 is larger than the diameter (R1 direction dimension) of the second rotation prevention member 65.

More specifically, the R1 direction dimension of the second rotation prevention member 65 is R1 direction dimension A3, and the C1 direction dimension of the second rotation prevention member 65 is C1 direction dimension B3. The R1 direction dimension of the long hole 67 in the first junction member 57A is R1 direction dimension A5, and the C1 direction dimension of the long hole 67 in the first junction member 57A is C1 direction dimension B5. D4 is the inside diameter (diameter) of the inner peripheral face 43a of the supporting section 43 of the tubular section 41A that accommodates the supported section 61e of the first junction member 57A, and D5 is the outside diameter (diameter) of the outer peripheral face of the supported section 61e in the tubular section 41A.

As described in the first embodiment, diameter D1 is the diameter of the one end 36a of the change drum 36, and diameter D2 is the diameter of the inner peripheral face of the guide 41b of the tubular section 41A of the change cam 34A. With respect to the first fitting structure 44, A1 is the R1 direction dimension of the first rotation prevention member 45, and B1 is the C1 direction dimension of the first rotation prevention member 45. In addition, (A2−A1)>(B2−B1), and D2>D1.

With respect to the second fitting structure 64, A5>A3. In addition, B5>B3. Further, D4>D5. Furthermore, (A5−A3)>(B5−B3). That is, in the second fitting structure 64, the gap between the change cam 34A and the junction body 51A (first junction member 57) in radial direction R1 (A5−A3) is larger than the gap between the change cam 34A and the junction body 51A (first junction member 57A) in circumferential direction C1 (B5−B3).

With the above structure, while the transmission error in circumferential direction C1 between the second rotation prevention member 65 (change cam 34) and the first junction member 57A can be prevented, the dimension error in radial direction R1 can be easily absorbed. The circular hole 66 that fixes the second rotation prevention member 65 may be formed in the outer periphery of the first junction member 57, and the long hole 67 may be formed on the one end face 34a side of the change cam 34.

The second fitting structure 64 and the first fitting structure 44 are different in position in circumferential direction C1. In this embodiment, the second rotation prevention member 65 of the second fitting structure 64 and the first rotation prevention member 45 of the first fitting structure 44 are spaced from each other by approximately 180° about rotational axis X1. In addition, part of the first rotation prevention member 45 and part of the second rotation prevention member 65 face in radial direction R1 (the positions thereof in axis direction S1 overlap). Thus, the space that is occupied by the first fitting structure 44 and the second fitting structure 64 in axis direction S1 can be shortened. Thus, the length of the rotation detecting device 25 in axis direction S1 can be made shorter.

On the outer periphery of the main body 61, a large-diameter section 61g and a small-diameter section 61h are formed. The diameter of the large-diameter section 61g is larger than the diameter of the small-diameter section 61h. The large-diameter section 61g is disposed toward the rotation sensor 52, and the small-diameter section 61h is disposed toward the change drum 36.

Most of the small-diameter section 61h is accommodated in the supporting section 43 of the tubular section 41. The boundary between the small-diameter section 61h and the large-diameter section 61g is substantially the boundary between the portion of the first junction member 57 accommodated in the supporting section 43 and the portion of the first junction member 57 projecting from the supporting section 43. With this structure, when a worker inserts the first junction member 57A into the change cam 34, the boundary between the small-diameter section 61h and the large-diameter section 61g can be an indicator for the insertion amount of the first junction member 57A.

The first flange 62 is continuous to the end of the main body 61 having the above structure on the second junction member 58A side (the other end). The first flange 62 is coupled to the second junction member 58A. The first flange 62 is formed into an annular plate shape having a predetermined thickness, and forms the other end of the first junction member 57A.

The first flange 62 is disposed from the change cam 34A toward the rotation sensor 52 in axis direction S1. The outer periphery of the first flange 62 is opposite to the pins 42 of the change cam 34A in axis direction S1. With this structure, the first flange 62 is disposed in the space between the pins 42 and the cover main body 27 of the transmission cover 22. On one side face of the first flange 62 directing to the rotation sensor 52, a convex section 75A is disposed. The convex section 75A will be described later in detail.

The first junction member 57A having the above structure is coupled to the second junction member 58A so as to be integrally rotatable about rotational axis X1. Further, the second junction member 58A is coupled to the first junction member 57A and the rotor 53 of the rotation sensor 52 so as to be integrally rotatable about rotational axis X1. In this embodiment, although the relative displacement between the first junction member 57A and the second junction member 58A in circumferential direction C1 is prevented, the relative displacement between the first junction member 57A and the second junction member 58A in axis direction S1 and the relative displacement between the first junction member 57A and the second junction member 58A in radial direction R1 can be allowed. With this structure, the first junction member 57A and the second junction member 58A are coupled to each other in a state where the relative displacement between the first junction member 57A and the second junction member 58A in circumferential direction C1 is reliably prevented without increasing the assembling accuracy that much.

The second junction member 58A is disposed between the first junction member 57A and the transmission cover 22 in axis direction S1. The intermediate portion of the second junction member 58A in axis direction S1 expands in radial direction R1.

The second junction member 58A has a base end 69A, a second flange 70A, and a distal end 71A. The base end 69A, the second flange 70A, and the distal end 71A are aligned in this order along axis direction S1.

The base end 69A is formed into a disc shape having a predetermined thickness. The base end 69A is fitted to the first flange 62 of the first junction member 57A. In this embodiment, the base end 69A is fitted to the first flange 62 in a clearance fit state. The base end 69A fitted to the first flange 62 faces the head 35a of the fixing member 35. The base end 69 is continuous to the second flange 70A.

The second flange 70A is formed into a plate shape, and in this embodiment, is formed into a disc shape. The second flange 70A is sandwiched between the base end 69A and the distal end 71A. The second flange 70A overlaps with the first flange 62 in axis direction S1, and the opposing faces of the second flange 70A and the first flange 62 are in contact with each other.

With the above structure, one side face of the second flange 70A that directs to the first junction member 57A and is brought into contact with the first junction member 57A and the outer peripheral face of the base end 69A form a received section 72A received by the first junction member 57A. By the contact between the base end 69A and the first flange 62A, the relative displacement amount between the first junction member 57A and the second junction member 58A in radial direction R1 is prevented in a predetermined range. In addition, the received section 72A of the second junction member 58A closes the space of the first junction member 57A accommodating the head 35a of the fixing member 35. Thus, the space in the interior of the large-diameter section 61a of the main body 61 of the first junction member 57A accommodating the head 35a of the fixing member 35 is closed.

The first junction member 57A and the second junction member 58A are coupled by using a third fitting structure 74A so as to be integrally rotatable about rotational axis X1.

The third fitting structure 74A couples the first junction member 57A and the second junction member 58A by fitting. In the third fitting structure 74A, the gap (position adjustable amount) between the first junction member 57A and the second junction member 58A in radial direction R1 is larger than the gap between the first junction member 57A and the second junction member 58A in circumferential direction C1. In addition, the third fitting structure 74A couples the first junction member 57A and the second junction member 58A so as to be relatively displaceable in axis direction S1 and in radial direction R1. The third fitting structure 74A is disposed in the interior of the transmission cover 22.

The third fitting structure 74A includes the convex section 75A formed in one of the first junction member 57A and the second junction member 58A, and a concave section 76A formed in the other of the first junction member 57A and the second junction member 58A.

The convex section 75A and the concave section 76A are spaced from rotational axis X1 in radial direction R1 and at the position different from the second rotation prevention member 65 in circumferential direction C1. The convex section 75A is fitted in the concave section 76A.

In this embodiment, the convex section 75A is integrated with the outer peripheral edge of the first flange 62 of the first junction member 57A, and projects from one side face of the first flange 62 directing to the rotation sensor 52 toward the rotation sensor 52 in parallel with axis direction S1. The convex section 75A is formed into a pillar shape, and is formed into a semi-circular shape that is convex toward rotational axis X1 in the cross section orthogonal to axis direction S1.

In this embodiment, the concave section 76A is formed in the second flange 70A of the second junction member 58A, and is recessed at a portion of the outer peripheral edge of the second flange 70A toward rotational axis X1. The concave section 76A penetrates through the second flange 70A in parallel with axis direction S1. The concave section 76A is formed into a pillar shape, and is formed into a substantially semi-circular shape that is recessed toward rotational axis X1 in the cross section orthogonal to axis direction S1.

In this embodiment, the relative rotation of the convex section 75A with respect to the concave section 76A about circumferential direction C1 is substantially prevented. On the other hand, the convex section 75A can be allowed to be displaced from the concave section 76A in radial direction R1.

More specifically, the R1 direction dimension of the convex section 75A is R1 direction dimension A6, and the C1 direction dimension of the convex section 75A is C1 direction dimension B6. In addition, the R1 direction dimension of the concave section 76A is R1 direction dimension A7, and the C1 direction dimension of the concave section 76A is C1 direction dimension B7.

In this embodiment, A7>A6. In addition, B7>B6. Further, (A7−A6)>(B7−B6). That is, in the third fitting structure 74A, the gap between the convex section 75 and the concave section 76 in radial direction R1 (A7−A6) is larger than the gap between the convex section 75A and the concave section 76A in circumferential direction C1 (B7−B6).

In the above structure, while the transmission error of the convex section 75A and the concave section 76A in the third fitting structure 74A in circumferential direction C1 can be prevented, the dimension error of the convex section 75A and the concave section 76A in the third fitting structure 74A in radial direction R1 can be easily absorbed.

The convex section 75A and the concave section 76A in circumferential direction C1 are substantially aligned with the first rotation prevention member 45 in circumferential direction C1. On the other hand, the position of the convex section 75A and the concave section 76A in circumferential direction C1 is different from the position of the second rotation prevention member 65 in circumferential direction C1, and in this embodiment, is different by 180°. That is, the position where the rotational force is provided from the change cam 34A to the change drum 36 and the position where the rotational force is provided from the change cam 34A to the first junction member 57 are different by 180° in circumferential direction C1.

In this way, the position where the rotational force is provided from the change cam 34A to the first junction member 57 and the position where the rotational force is provided from the first junction member 57A to the second junction member 58A are different by 180° in circumferential direction C1. Thus, in the rotation detecting device 25, the load transmission balance between the members can be improved. As a result, the rotational force from the change cam 34A to the first junction member 57A, the second junction member 58A, and the rotor 53 can be transmitted more smoothly.

The supported section 61e that is one end of the junction body 51A and the change cam 34A are fixed by using the fixing member 35 coaxial with rotational axis X1, and the distal end 71 of the second junction member 58A that is the other end of the junction body 51A and the rotor 53 of the rotation sensor 52 are coupled to each other on the same axis as rotational axis X1. On the other hand, the first fitting structure 44, the second fitting structure 64, and the third fitting structure 74A in the junction body 51 for transmitting rotation are eccentric with respect to rotational axis X1.

With the above structure, in the second fitting structure 64 that is the engaging portion of the junction body 51A and the change cam 34A, the gap in radial direction R1 is larger than the gap in circumferential direction C1. Likewise, in the engaging portion of the junction body 51A and the rotor 53, the gap in radial direction R1 is larger than the gap in circumferential direction C1. Thus, the transmission error of the rotational force can be prevented, and the error in radial direction R1 can be allowed.

More specifically, the base end 69A of the second junction member 58A of the junction body 51A is inserted and supported in the large-diameter section 61a (screw head accommodation section) of the first junction member 57A held by the change cam 34A. The large-diameter section 61a is formed into a tubular shape, and at the end thereof on the rotation sensor 52 side, the third fitting structure 74A as the engaging section is formed. In a state where the base end 69 of the second junction member 58 of the junction body 51A is inserted into the first junction member 57A supported by the change cam 34A, the convex section 75A of the third fitting structure 74A is opposite to both side walls in circumferential direction C1 of the concave section 76A of the second junction member 58A of the junction body 51A. Thus, the second junction member 58A of the junction body 51A can be prevented from being rotated in circumferential direction C1 with respect to the change cam 34A.

The receiving section of the first junction member 57A supported by the change cam 34A into which the second junction member 58A is inserted projects in axis direction S1 from the projecting positions of the pins 42. In this example, the receiving section projects toward the rotation sensor 52 in axis direction S1 with respect to the ends of the pins 42. By disposing part of the first junction member 57A inwardly of the space enclosed by the pins 42 in this manner, the axial direction dimension of the junction body 51A can be shortened.

The second flange 70A that is larger than the diameter of the large-diameter section 61a (screw head accommodation section) is formed in the second junction member 58A of the junction body 51A on the rotation sensor 52 side with respect to the base end 69A. Thus, the first junction member 57A and the second junction member 58A of the junction body 51A can be abutted in axis direction S1, so that the axial direction position of the junction body 51A with respect to the change cam 34A can be easily aligned.

The axial direction dimension of the large-diameter section 61a of the first junction member 57A supported by the change cam 34A is larger than the total axial direction dimension of the head 35a of the fixing member 35 and the base end 69A of the second junction member 58A of the junction body 51A. Thus, both of the head 35a of the fixing member 35 and the base end 69A can be accommodated in the first junction member 57A in a state where they are aligned in axis direction S1. By aligning the fixing member 35 and the junction body 51A in the axis direction in this manner, the rotational axis of the rotor 53 can be coaxial with the change drum 34A. That is, like the pins 42 of the change cam 34A, even when the outer periphery at one end in the axis direction of the change drum 36 is used for power transmission, the rotor 53 can be coaxial with the rotational axis of the change drum 36.

In particular, even when the change drum 36 (rotation member) is separated from the tubular section 41A for transmitting the power to the change drum 36 (rotation member itself) and the change drum 36 and the tubular section 41A are coaxially fastened by the bolt, the junction body 51A can be supported by using the bolt fastening hole, and therefore the structure can be simplified.

As described above, according to the second embodiment, the junction body 51A includes the supported section 61e, and the long hole 67 as a rotation prevention section in which the second rotation prevention member 65 is fitted. With this structure, the supported section 61e that prevents movement in radial direction R1 with respect to the change drum 36 is fitted on the inner peripheral face of the tubular section 41 of the change cam 34A. In addition, the long hole 67 is fitted on the second rotation prevention member 65 disposed on the end face side of the tubular section 41 of the change cam 34A to prevent movement in circumferential direction C1 with respect to the change drum 36. By forming the supported section 61e and the long hole 67 at the different positions in this manner, the inner peripheral face of the tubular section 41A can be easily formed.

In this embodiment, the supported section 61e of the first junction member 57A is fitted on the inner peripheral face of the tubular section 41A of the change cam 34A, and further, the fixing member 35 is fitted on the inner peripheral face of the supported section 61e. Thus, the tubular section 41A of the change cam 34A fixes the supported section 61e, and accommodates the fixing member 35. Thus, the tubular section 41A of the change cam 34A can share the structure accommodating the fixing member 35 and the structure supporting the junction body 51A (supported section 61e). Thus, the shape around the tubular section 41A of the change cam 34A can be prevented from being complicated. In addition, by removing the fixing member 35 from the tubular section 41A of the change cam 34A to release the fixing by the fixing member 35, the junction body 51A is removed from the tubular section 41A and the change drum 36 for the replacement of the tubular section 41.

According to this embodiment, although the change cam 34A is interposed between the change drum 36 and the first junction member 57A, the change drum 36 and the first junction member 57A of the junction body 51A can be prevented from being rotated by the first fitting structure 44 and the second fitting structure 64. Thus, the rotating position detection error in circumferential direction C1 can be reduced.

According to this embodiment, the first fitting structure 44 couples the change drum 36 and the change cam 34A at only one position in circumferential direction C1. Likewise, the second fitting structure 64 couples the change cam 34A and the first junction member 57 at only one position in circumferential direction C1. Further, the third fitting structure 74A couples the first junction member 57A and the second junction member 58A at only one position in circumferential direction C1. In this way, the engaging positions of the first junction member 57A and the second junction member 58A are rotationally asymmetric, so that the engaging positions of the first junction member 57A and the second junction member 58A can be prevented from engaging with each other at the position other than the one position. Thus, the change drum 36 and the rotor 53 do not engage with each other at the position displaced from the original setting position in circumferential direction C1, so that erroneous assembling can be prevented. In addition, with such a structure, the rotative movement of the change drum 36 can be transmitted to the rotor 53 of the rotation sensor 52 via the change cam 34A and the junction body 51A more precisely. Thus, the change drum 36 can be rotation-detected by the rotation sensor 52 more precisely and easily.

According to this embodiment, the first fitting structure 44, the second fitting structure 64, and the third fitting structure 74A are formed into engaging shapes different from each other. Thus, in the first fitting structure 44, the second fitting structure 64, and the third fitting structure 74A, erroneous assembling between the fitting structures by the worker can be prevented. By adopting the structure preventing erroneous assembling in this manner, the worker can assemble the rotation detecting device 25 more precisely.

According to this embodiment, the first junction member 57A has the main body 61. The main body 61 is fixed to the change cam 34A and the change drum 36 by using the fixing member 35 inserted into the main body 61. With this structure, the fixing member 35 can be accommodated in the interior of the first junction member 57A. Thus, the rotation detecting device 25 can be made more compact.

According to this embodiment, the step 61b is formed on the inner periphery of the main body 61 of the first junction member 57A. In addition, the fixing member 35 is a bolt that fastens the first junction member 57A and the change drum 36. The fixing member 35 includes the head 35a received by the step 61b, and the male screw 35c that projects from the main body 61 of the first junction member 57A and is screwed into the female screw 36c of the change drum 36. With this structure, the first junction member 57A and the change drum 36 can be strongly fixed by using the shaft force of the fixing member 35. Thus, the first junction member 57A and the change drum 36, which are separated from each other, can be prevented from being displaced in circumferential direction C1 more reliably.

According to this embodiment, the second fitting structure 64 includes the long hole 67. The long hole 67 is fitted on the second rotation prevention member 65 disposed on the change cam 34 on the change drum 36 side. With this structure, by the simple structure that fits the second rotation prevention member 65 in the long hole 67, the first junction member 57A and the change drum 36 can be coupled to each other in a state where they can be position-adjusted in radial direction R1.

According to this embodiment, the change cam 34A is separated from the first junction member 57A. With this structure, for example, before the first junction member 57A of the junction body 51A is mounted on the change cam 34A, the change cam 34A is disposed on the change drum 36 so that the first junction member 57A can be mounted on the change drum 36. In addition, the change cam 34A and the first junction member 57A of the junction body 51A can be formed individually. Thus, the degree of freedom of the setting of the shapes of the change cam 34A and the junction body 51A can be made higher.

Although the embodiments of the present invention have been described above, the present invention is not limited to the above embodiments, and various changes can be made only in the described claims. For example, the present invention may be embodied by being changed as follows.

(1) In the first embodiment, the convex section 75 is integrated with the tubular section 41 of the change cam 34. However, the present invention is not limited to this. For example, the convex section 75 may be separated from the tubular section 41.

(2) In the above embodiments, in the first fitting structure 44, the second fitting structure 64, and the third fitting structures 74 and 74A, two members can be prevented from being rotated by a combination of the convex and concave shapes. However, the present invention is not limited to this. In place of the first fitting structure 44, the second fitting structure 64, and the third fitting structures 74 and 74A, the rotation prevention structure may be achieved by a combination of shapes other than the convex and concave shapes.

(3) In the above embodiments, to fix the first junction members 57 and 57A to the change drum 36, the fixing member 35 that is a bolt is used. However, the present invention is not limited to this. For example, by using a fixing member other than the bolt, the first junction members 57 and 57A may be fixed to the change drum 36.

(4) In the above embodiments, the number of junction members of each of the junction bodies 51 and 51A is two. However, the present invention is not limited to this. For example, each junction body may include three or more junction members.

(5) In the above embodiments, the functioning portions include the pins 42 of the change cams 34 and 34A. However, the present invention is not limited to this. For example, the functioning portions may include members other than the pins 42.

(6) In the above embodiments, the rotation detecting device 25 is disposed in the motorcycle 1. However, the present invention is not limited to this. For example, the rotation detecting device 25 may be disposed in other apparatuses.

(7) In the engaging structure of the junction bodies 51 and 51A and the rotor 53, the convex section may be formed in the rotor 53 so as to be inserted into the concave section formed in the junction body 51. In addition, the rotor 53 and the junction bodies 51 and 51A may be rotation-prevented and supported via a fixing structure, such as a bolt and a pin. Likewise, in the engaging structure of the junction bodies 51 and 51A and the change drum 36, the convex section formed in the change drum 36 may be inserted into the junction bodies 51 and 51A. In addition, the change drum 36 and the junction bodies 51 and 51A may be rotation-prevented and supported via a fixing structure, such as a bolt and a pin.

(8) The change cams 34 and 34A may function as part of the junction bodies 51 and 51A, respectively.

(9) Although the change cams 34 and 34A transmit the power to the change drum 36 as a rotation member by the cam structure, the present invention is not limited to this. For example, the structure transmitting the power to the change drum 36 may be a structure other than the cam structure, and may be, for example, a structure that is formed on the outer peripheral face, specifically, a gear, a sprocket, and a pulley structure, so that the power from the change lever 33 may be transmitted to the change drum 36.

(10) A rotation member other than the change drum 36 may be used. As such a rotation member, a rotation shaft, such as a throttle valve shaft, a vehicle shaft, and a steering wheel grip shaft, can be illustrated.

Figure 11:
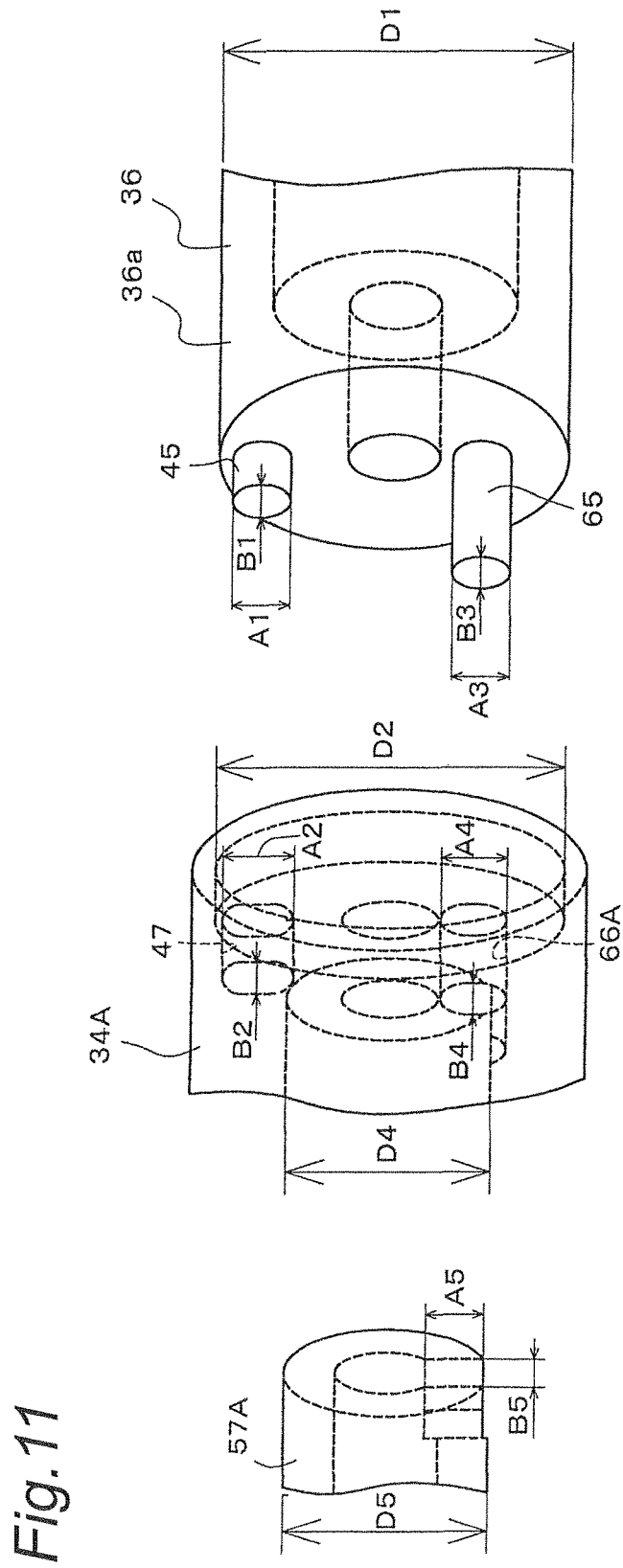
FIG. 11 is a schematic exploded perspective view of a main portion according to a modification of the present invention.

(11) In the second embodiment, as the second fitting structure 64, the second rotation prevention member 65 is fixed to the change cam 34A. However, the present invention is not limited to this. For example, like the modification illustrated in FIG. 11, the second rotation prevention member 65 may be fixed to the one end 36*a* of the change drum 36. In this case, in place of the hole 66, a long hole 66A with which the second rotation prevention member 65 is not brought into contact is formed in the change cam 34A. The long hole 66A elongatedly extends along radial direction R1 in the cross section orthogonal to axis direction S1.

In this case, the rotational force of the change drum 36 can be directly transmitted to the long hole 67 of the first junction member 65 via the second rotation prevention member 65.

Here, the R1 direction dimension of the long hole 66A of the change cam 34A is R1 direction dimension A4, and the C1 direction dimension of the long hole 66A of the change cam 34A is C1 direction dimension B4.

In this case, A4>A3. In addition, B4>B3. In this case, the following conditions are satisfied:

$$(A2-A1)>(B2-B1) \quad (1)$$

$$D2>D1 \quad (2)$$

$$(A4-A3)>(A2-A1) \quad (3)$$

$$(B4-B3)>(B2-B1) \quad (4)$$

$$(A5-A3)>(B5-B3) \quad (5)$$

$$D4>D5 \quad (6)$$

Equations (1), (2), (5), and (6) are the same as the second embodiment. Equation (3) means that the gap between the second rotation prevention member 65 and the change cam 34A in radial direction R1 is larger than the gap between the first rotation prevention member 45 and the change cam 34A in radial direction R1. Equation (4) means that the gap between the second rotation prevention member 65 and the change cam 34 in circumferential direction C1 is larger than the gap between the first rotation prevention member 45 and the change cam 34 in circumferential direction C1.

(12) Although some examples of the present invention have been described, as long as the rotation detecting device of the present invention has at least the rotation sensor and the junction body, other structures may be eliminated.

The present invention is widely applicable as the rotation detecting device.

The invention claimed is:

1. A rotation detecting device comprising:
a rotation sensor including a rotor spaced from a rotation member in an axial direction of the rotation member and rotatable about a rotational axis of the rotation member, a detector detecting a rotating position of the rotor, and a housing supporting the rotor and the detector; and
a junction body separatable from the rotation member and the rotation sensor, rotatable about the rotational axis, and transmitting the rotative movement of the rotation member to the rotor,
wherein the junction body is supported by the rotation member on a first side in the axial direction extending along the rotational axis, and is supported by the rotor on a second side in the axial direction, and
wherein the junction body includes:
a supported portion fitted on an inner peripheral face of a tubular section disposed on the first side and formed into a tubular shape to prevent movement in the radial direction with respect to the rotation member; and
a rotation prevention portion fitted on a rotation prevention section formed on an end face of the tubular section to prevent relative movement in the circumferential direction with respect to the rotation member.

2. A rotation detecting device comprising:
a rotation sensor including a rotor spaced from a rotation member in an axial direction of the rotation member and rotatable about a rotational axis of the rotation member, a detector detecting a rotating position of the rotor, and a housing supporting the rotor and the detector; and
a junction body separatable from the rotation member and the rotation sensor, rotatable about the rotational axis, and transmitting the rotative movement of the rotation member to the rotor,
wherein the junction body is supported by the rotation member on a first side in the axial direction extending along the rotational axis, and is supported by the rotor on a second side in the axial direction,
wherein the junction body includes a supported portion fitted on an inner peripheral face of a tubular section disposed on the first side and formed into a tubular shape to prevent movement in the radial direction of the rotational axis with respect to the rotation member,
wherein the tubular section is fixed to the rotation member in such a manner that a fixing member separated from the rotation member and fixing the tubular section to the rotation member is inserted through the inner peripheral face of the tubular section, and
wherein the supported portion of the junction body is fitted on the inner peripheral face of the tubular section through which the fixing member is inserted.

3. A rotation detecting device comprising:
a rotation sensor including a rotor spaced from a rotation member in an axial direction of the rotation member and rotatable about a rotational axis of the rotation member, a detector detecting a rotating position of the rotor, and a housing supporting the rotor and the detector;
a junction body separatable from the rotation member and the rotation sensor, rotatable about the rotational axis, and transmitting the rotative movement of the rotation member to the rotor; and
a tubular section disposed on a rotation member side, the tubular section being formed into a tubular shape and supporting the junction body, the tubular section having functioning portions on an outer periphery thereof, the functioning portions having a function different from supporting of the junction body, wherein the functioning portions include transmission portions formed on the outer periphery of the tubular section and transmitting a rotational force to the rotation member, and wherein the junction body is supported by the tubular section inward in a radial direction with respect to the transmission portions.

4. A rotation detecting device comprising:

a rotation sensor including a rotor spaced from a rotation member in an axial direction of the rotation member and rotatable about a rotational axis of the rotation member, a detector detecting a rotating position of the rotor, and a housing supporting the rotor and the detector; and a junction body separatable from the rotation member and the rotation sensor, rotatable about the rotational axis, and transmitting the rotative movement of the rotation member to the rotor, and a tubular section disposed on a rotation member side, the tubular section being formed into a tubular shape and supporting the junction body, the tubular section having functioning portions on an outer periphery thereof, the functioning portions having a function different from supporting of the junction body, wherein the rotation member includes a drum member for shifting a shift fork included in a gear transmission mechanism, wherein a rotational force provided from a rider is transmitted to the drum member via the functioning portions, and wherein the rotation sensor can detect the angular position of the drum member via the junction body.

5. The rotation detecting device according to claim 1, further comprising a casing main body accommodating the rotation member, and a cover provided attachably and detachably to the casing main body, the housing of the rotation sensor being fixed to the cover.

6. A rotation detecting device comprising:

a rotation sensor including a rotor spaced from a rotation member in an axial direction of the rotation member and rotatable about a rotational axis of the rotation member, a detector detecting a rotating position of the rotor, and a housing supporting the rotor and the detector;

a junction body separatable from the rotation member and the rotation sensor, rotatable about the rotational axis, and transmitting the rotative movement of the rotation member to the rotor; and a fitting structure coupling the junction body and the rotation member by fitting, wherein the fitting structure is configured such that a gap between the junction body and the rotation member in a radial direction of the rotational axis is larger than a gap between the junction body and the rotation member in a circumferential direction of the rotational axis.

7. The rotation detecting device according to claim 1, a fitting structure coupling the junction body and the rotation member by fitting, wherein the fitting structure is configured such that a gap between the junction body and the rotation member in a radial direction of the rotational axis is larger than a gap between the junction body and the rotation member in a circumferential direction of the rotational axis.

8. The rotation detecting device according to claim 1, wherein the housing is inserted into a transmission cover, and a seal member is disposed between an outer peripheral face of the housing and an inner peripheral face of the cover.

9. The rotation detecting device according to claim 1, wherein the rotation sensor is a magnetic sensor, and the rotational axis of the rotor is coaxial with a change drum.

* * * * *